(12) United States Patent
Sakashita et al.

(10) Patent No.: US 9,731,693 B2
(45) Date of Patent: Aug. 15, 2017

(54) DISK BRAKE APPARATUS

(71) Applicant: HITACHI AUTOMOTIVE SYSTEMS, LTD., Ibaraki (JP)

(72) Inventors: Takayasu Sakashita, Tokyo (JP); Hirotaka Oikawa, Kanagawa (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/033,611

(22) Filed: Sep. 23, 2013

(65) Prior Publication Data

US 2014/0095042 A1 Apr. 3, 2014

(30) Foreign Application Priority Data

Sep. 28, 2012 (JP) .................................. 2012-218358

(51) Int. Cl.
- *B60T 13/74* (2006.01)
- *B60T 13/58* (2006.01)
- *B60T 13/66* (2006.01)

(52) U.S. Cl.
CPC .......... *B60T 13/745* (2013.01); *B60T 13/588* (2013.01); *B60T 13/662* (2013.01); *B60T 13/741* (2013.01)

(58) Field of Classification Search
USPC ......................................................... 701/70
See application file for complete search history.

(56) References Cited

U.S. PATENT DOCUMENTS

| 3,350,142 A * | 10/1967 | Schuman | B60T 13/58 188/3 R |
| 5,794,734 A * | 8/1998 | Fahl | B60T 1/10 180/165 |

(Continued)

FOREIGN PATENT DOCUMENTS

| EP | 1985884 A1 * | 10/2008 | ............. F16D 65/14 |
| EP | 1985884 B1 * | 10/2012 | |

(Continued)

OTHER PUBLICATIONS

Notice of Reason for Rejection issued Dec. 1, 2015 in corresponding Japanese Application No. 2012-218358 (with partial English translation).

*Primary Examiner* — Jean-Paul Cass
(74) *Attorney, Agent, or Firm* — Wenderoth, Lind & Ponack, L.L.P.

(57) ABSTRACT

A disk brake apparatus includes a piston thrust mechanism disposed in a caliper and including a thrust member configured to thrust a piston by an electric motor, and a piston holding mechanism configured to hold the thrust piston. When the piston holding mechanism release the holding of the thrust piston, the controller acquires a hydraulic pressure supplied to the caliper. If the hydraulic pressure is a predetermined value or higher, the controller determines whether a thrust force generated by the electric motor is released based on a time period from issue of an instruction to release the holding of the piston and a start of driving of the electric motor. If the hydraulic pressure is lower than the predetermined value, the controller determines whether the thrust force generated by the electric motor is released based on a change status of a current for driving the electric motor.

12 Claims, 7 Drawing Sheets

(56) References Cited

U.S. PATENT DOCUMENTS

| | | | | |
|---|---|---|---|---|
| 6,149,248 A * | 11/2000 | Lubbers | ............... | B60T 7/042 |
| | | | | 188/358 |
| 6,183,050 B1 * | 2/2001 | Ganzel | ............... | B60T 7/042 |
| | | | | 188/358 |
| 6,280,002 B1 * | 8/2001 | Goodzey | ............ | B60T 13/686 |
| | | | | 188/358 |
| 6,309,031 B1 * | 10/2001 | Crombez | ............ | B60T 7/042 |
| | | | | 303/113.4 |
| 6,361,127 B1 * | 3/2002 | Inoue | ............... | B60T 7/12 |
| | | | | 303/114.3 |
| 6,394,235 B1 | 5/2002 | Poertzgen et al. | | |
| 6,460,944 B2 * | 10/2002 | Isono | ............... | B60T 13/72 |
| | | | | 303/114.1 |
| 6,471,304 B1 * | 10/2002 | Deml | ............... | B60T 7/042 |
| | | | | 303/113.4 |
| 6,513,882 B1 * | 2/2003 | Schneider | ............ | B60L 7/26 |
| | | | | 303/112 |
| 6,527,348 B2 * | 3/2003 | Jensen | ............ | B60T 17/18 |
| | | | | 303/113.1 |
| 6,866,348 B2 * | 3/2005 | Ewel | ............... | B60T 8/4225 |
| | | | | 303/113.1 |
| 7,104,364 B2 * | 9/2006 | Godlewsky | ............ | F16D 65/18 |
| | | | | 188/1.11 L |
| 8,430,213 B2 * | 4/2013 | Yokoyama | ............ | B60T 13/741 |
| | | | | 188/1.11 E |
| 8,448,756 B2 * | 5/2013 | Knechtges | ............ | B60T 8/32 |
| | | | | 188/72.2 |
| 8,888,197 B2 * | 11/2014 | Miyazaki | ............ | B60T 8/4081 |
| | | | | 303/116.2 |
| 8,892,327 B2 * | 11/2014 | Hachtel | ............ | B60T 8/3265 |
| | | | | 701/32.1 |
| 2002/0105224 A1 * | 8/2002 | Nakano | ............ | B60T 8/343 |
| | | | | 303/114.3 |
| 2003/0125863 A1 * | 7/2003 | Tamasho | ............ | B60T 13/741 |
| | | | | 701/70 |
| 2005/0077783 A1 * | 4/2005 | Suzuki | ............ | B60T 7/107 |
| | | | | 303/89 |
| 2009/0045672 A1 * | 2/2009 | Nishino | ............ | B60T 7/042 |
| | | | | 303/113.3 |
| 2010/0012445 A1 * | 1/2010 | Ollat | ............ | B60T 13/588 |
| | | | | 188/173 |
| 2010/0191400 A1 * | 7/2010 | Ajiro | ............ | B60T 1/10 |
| | | | | 701/22 |
| 2011/0042171 A1 * | 2/2011 | Knechtges | ............ | B60T 8/32 |
| | | | | 188/106 F |
| 2011/0308898 A1 | 12/2011 | Shiraki | | |
| 2012/0010045 A1 * | 1/2012 | Nedorezov | ............ | B60W 10/023 |
| | | | | 477/79 |
| 2012/0053012 A1 * | 3/2012 | Yamada | ............ | B60W 10/02 |
| | | | | 477/46 |
| 2012/0115679 A1 * | 5/2012 | Doering | ............ | B60W 10/023 |
| | | | | 477/70 |
| 2012/0126610 A1 * | 5/2012 | Nakata | ............ | B60T 1/10 |
| | | | | 303/9.63 |
| 2013/0191005 A1 * | 7/2013 | Hrovat | ............ | F02N 11/0837 |
| | | | | 701/102 |
| 2013/0241275 A1 * | 9/2013 | Miyazaki | ............ | B60T 8/4081 |
| | | | | 303/6.01 |
| 2015/0035352 A1 * | 2/2015 | Fujiki | ............ | B60T 7/042 |
| | | | | 303/15 |
| 2016/0264113 A1 * | 9/2016 | Feigel | ............ | B60T 8/326 |
| 2016/0339888 A1 * | 11/2016 | Yokoyama | ............ | B60T 7/042 |

FOREIGN PATENT DOCUMENTS

| | | |
|---|---|---|
| JP | 2001-510760 | 8/2001 |
| JP | 2003-83373 | 3/2003 |
| WO | 2010/097938 | 9/2010 |

* cited by examiner

DISK BRAKE APPARATUS

BACKGROUND OF THE INVENTION

The present invention relates to a disk brake apparatus configured to apply a braking force to a vehicle such as an automobile.

A disk brake is known as a brake apparatus mounted on a vehicle such as an automobile. This disk brake supplies a hydraulic pressure from the outside into a cylinder of a caliper to push a piston toward a surface side of a disk together with brake pads, thereby generating a braking force.

As this disk brake, there is known a hydraulic disk brake provided with an electric parking brake, which is configured to not only generate a braking force based on the hydraulic pressure when the vehicle is running, but also generate a braking force based on driving (a rotation) of an electric motor, for example, when the vehicle is stopped or parked (operate as a parking brake), as discussed in, for example, Japanese Patent Public Disclosure No. 2003-83373.

According to a conventional technique, the disk brake provided with the electric parking brake is configured to thrust the piston toward the disk by driving the electric motor when applying a braking force as the parking brake, and stop driving the electric motor when a current value of the electric motor exceeds a preset threshold value.

A possible method for releasing the parking brake is to stop driving the electric motor according to the current value of the electric motor. However, according to the above-described configuration, the electric motor may excessively rotate depending on how much the hydraulic pressure is at that time, causing a member pushing the piston to be retracted far away from the disk. This results in an increase in a movement amount of the member pushing the piston next time the parking brake is activated, leading to a possibility of deterioration of responsiveness (an increase in a time taken to complete activation of the parking brake).

SUMMARY OF INVENTION

The present invention has been contrived in consideration of the above-described problem with the conventional technique, and an object of the present invention is to provide a disk brake apparatus capable of improving responsiveness of braking using an electric motor (a parking brake).

To achieve the above-described and other object, an aspect of the present invention is a disk brake apparatus including a caliper configured to press brake pads disposed on both surfaces of a disk by a piston disposed in a hydraulic cylinder, a piston thrust mechanism disposed in the caliper and including a thrust member configured to thrust the piston by an electric motor, a piston holding mechanism configured to hold the thrust piston, and a controller configured to control driving of the electric motor and stop the driving of the electric motor based on a current value of the electric motor or a time period from a start of the driving of the electric motor when the piston holding mechanism releases the holding of the piston. The controller acquires a hydraulic pressure supplied to the caliper when the piston holding mechanism releases the holding of the piston, determines whether a thrust force generated by the electric motor is released based on the time period from issue of an instruction to release the holding of the piston and the start of the driving of the electric motor if the hydraulic pressure is a predetermined value or higher, and determines whether the thrust force generated by the electric motor is released based on a change status of a current for driving the electric motor if the hydraulic pressure is lower than the predetermined value.

DESCRIPTION OF EMBODIMENTS

Hereinafter, a disk brake apparatus according to an embodiment of the present invention will be described in detail with reference to the accompanying drawings, based on an example in which this disk brake apparatus is mounted on a four-wheeled automobile.

Figure 1:
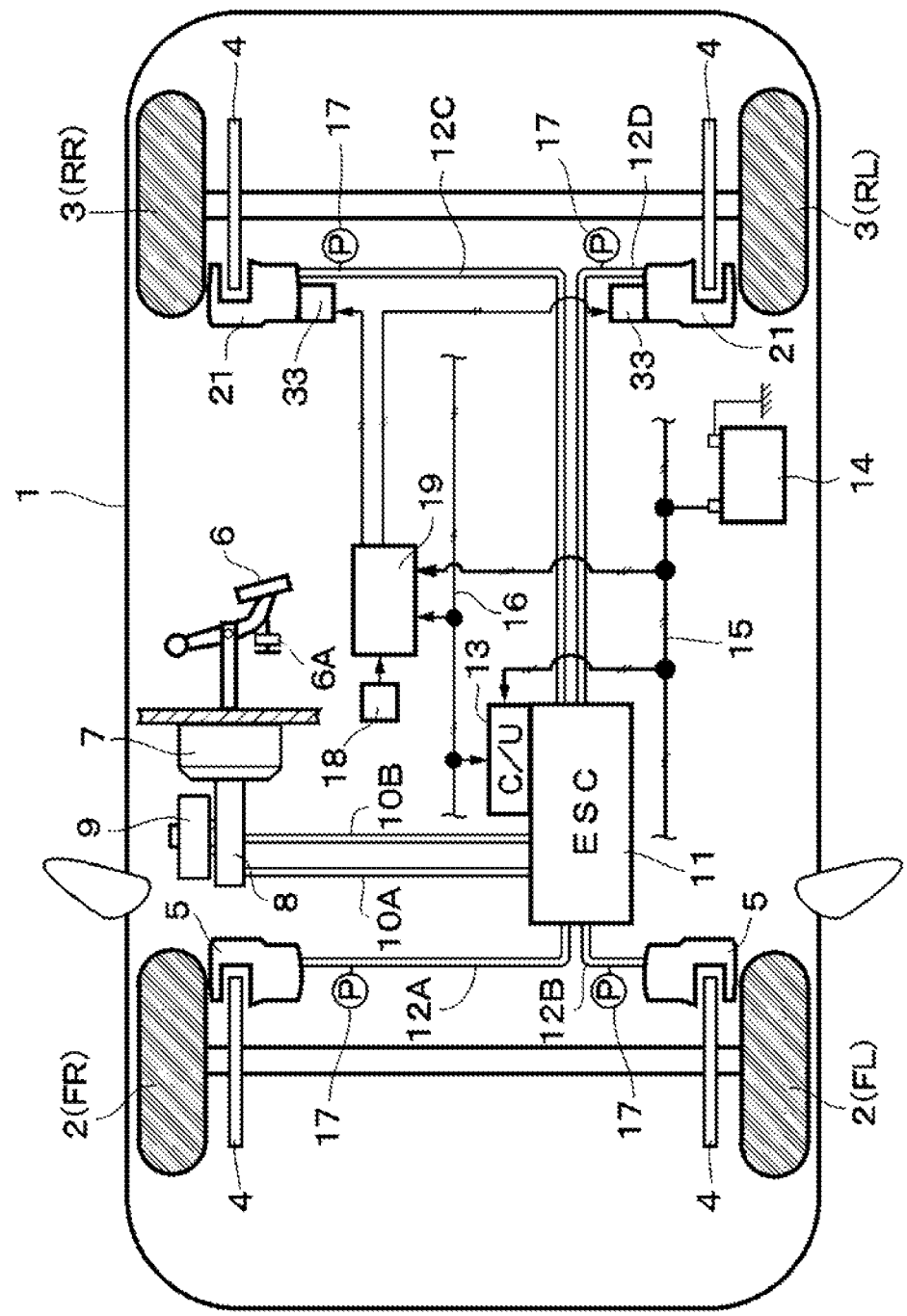
FIG. 1 is a conceptual diagram illustrating a vehicle on which a disk brake apparatus according to an embodiment of the present invention is mounted.

Referring to FIG. 1, for example, left and right front wheels 2 (FL and FR), and left and right rear wheels (RL and RR) 3 are mounted on the bottom side (the road surface side) of a vehicle body 1, which constitutes a body of a vehicle. Disk rotors 4 as integrally rotatable disks are disposed at the respective front wheels 2 and rear wheels 3. More specifically, at each front wheel 2, each disk rotor 4 is sandwiched by a hydraulic disk brake 5. At each rear wheel 3, each disk rotor 4 is sandwiched by a disk brake 21 provided with an electric parking brake, which will be described below. Therefore, a braking force is applied to each wheel (each front wheel 2 and each rear wheel 3).

A brake pedal 6 is disposed on a front board side of the vehicle body 1. The brake pedal 6 is operated to be pressed by a driver when a braking operation is performed at the vehicle. A pedal switch 6A is disposed at the brake pedal 6. This pedal switch 6A detects a pressing operation applied to the brake pedal 6, and outputs a detection signal thereof to a control unit 13, which will be described below.

The pressing operation applied to the brake pedal 6 is transmitted to a master cylinder 8 via a booster apparatus 7. The booster apparatus 7 is constituted by a negative pressure booster, an electric booster, or the like disposed between the brake pedal 6 and the master cylinder 8. When a pressing operation is applied to the brake pedal 6, the booster apparatus 7 multiplies the pressing force to transmit it to the master cylinder 8. At this time, the master cylinder 8 generates a hydraulic pressure from brake fluid supplied from a master reservoir 9. The master reservoir 9 constitutes a hydraulic fluid tank containing the brake fluid. The mechanism for generating a hydraulic pressure by the brake pedal 6 is not limited to the above-described example, and may be embodied by any mechanism capable of generating a hydraulic pressure according to an operation applied to the brake pedal 6, such as a brake-by-wire mechanism.

The hydraulic pressure generated in the master cylinder 8 is transmitted to a hydraulic supply apparatus 11 (hereinafter referred to as an ESC 11) via, for example, a pair of cylinder-side hydraulic pipes 10A and 10B. This ESC 11 distributes and supplies the hydraulic pressure from the master cylinder 8 to the respective disk brakes 5 and 21 via brake-side pipe portions 12A, 12B, 12C, and 12D. As a result, a braking force is applied to each wheel (each front wheel 2 and each rear wheel 3) as described above.

The ESC 11 includes a hydraulic supply apparatus controller 13 (hereinafter referred to as a control unit 13) that activates and controls the ESC 11. The control unit 13 drives and controls the ESC 11, thereby performing control so as to increase, reduce, or maintain a brake hydraulic pressure supplied from the brake-side pipe portions 12A to 12D to the respective disk brakes 5 and 21. As a result, it becomes possible to realize brake control such as boosting control, braking force distribution control, brake assist control, antiskid control, traction control, vehicle stabilization control including prevention of a sideslip, and hill start aid control.

The control unit 13 is constituted by, for example, a microcomputer, and power is supplied from a battery 14 to the control unit 13 via a power source line 15. Further, as illustrated in FIG. 1, the input side of the control unit 13 is connected to, for example, a vehicle data bus 16. The output side of the control unit 13 is connected to the ESC 11 via the power source line 15 and the vehicle data bus 16. The ESC 11 may be replaced with an ABS unit, which is a known technique. Further, without use of the ESC 11 (omitting the ESC 11), the vehicle may be configured in such a manner that the master cylinder 8 is directly connected to the brake-side pipe portions 12A to 12D.

The vehicle data bus 16 includes a CAN as a serial communication unit mounted on the vehicle body 1, and establishes multiplex communication for in-vehicle devices among, for example, a number of electric devices mounted on the vehicle, the control unit 13, and a parking brake controller 19 which will be described below. In this case, examples of vehicle operation information transmitted to the vehicle data bus 16 include information of detection signals from a steering angle sensor, an acceleration sensor, a brake sensor, a wheel speed sensor, a vehicle speed sensor, an orientation sensor, a stereo camera, a millimeter-wave radar, a seatbelt sensor, transmission data, and the like (all of them not illustrated). Further, examples of the vehicle operation information include a detection signal (information) from the pressure sensor 17 and the like.

The pressure sensor 17 is disposed at each of the brake-side pipe portions 12A, 12B, 12C, and 12D, and individually detects a pressure (hydraulic pressure) in each pipe, i.e., a hydraulic pressure P in a caliper 24 (a cylinder portion 26) corresponding to the pressure in the pipe. The caliper 24 will be described below. One or two sensors may be disposed as the pressure sensor 17. For example, the pressure sensor 17 may be disposed only at the cylinder-side hydraulic pressure pipes 10A and 10B that receive a pressure from the master cylinder 8, i.e., the pressure sensor 17 may be configured to function as a hydraulic pressure detector that detects a hydraulic pressure generated in the master cylinder.

A parking brake switch 18 is disposed at the vehicle body 1 at a position close to a driver's seat (not illustrated). The parking brake switch 18 is operated by the driver. When the parking brake switch 18 is operated, a control signal is output (power is supplied) from the parking brake controller 19, which will be described below, to the disk brake 21 at the rear wheel 3 (i.e., an electric actuator 33, which will be described below), whereby the disk brake 21 at the rear wheel 3 is actuated as a parking brake. Further, to release the actuation as parking brake, the parking brake switch 18 is operated toward a brake release side. According to this operation, a control signal is output (power is supplied) to the disk brake 21 to cause a reverse rotation of the electric actuator 33.

The parking brake may be actuated according to a logic of the parking brake controller 19 for determining actuation of the parking brake, such as a continuation of such a state that the vehicle speed is 0 km/h for a predetermined time. Further, the parking brake may be released according to a logic of the parking brake controller 19 for determining a release of the parking brake based on, for example, an operation of an accelerator.

Figure 2:
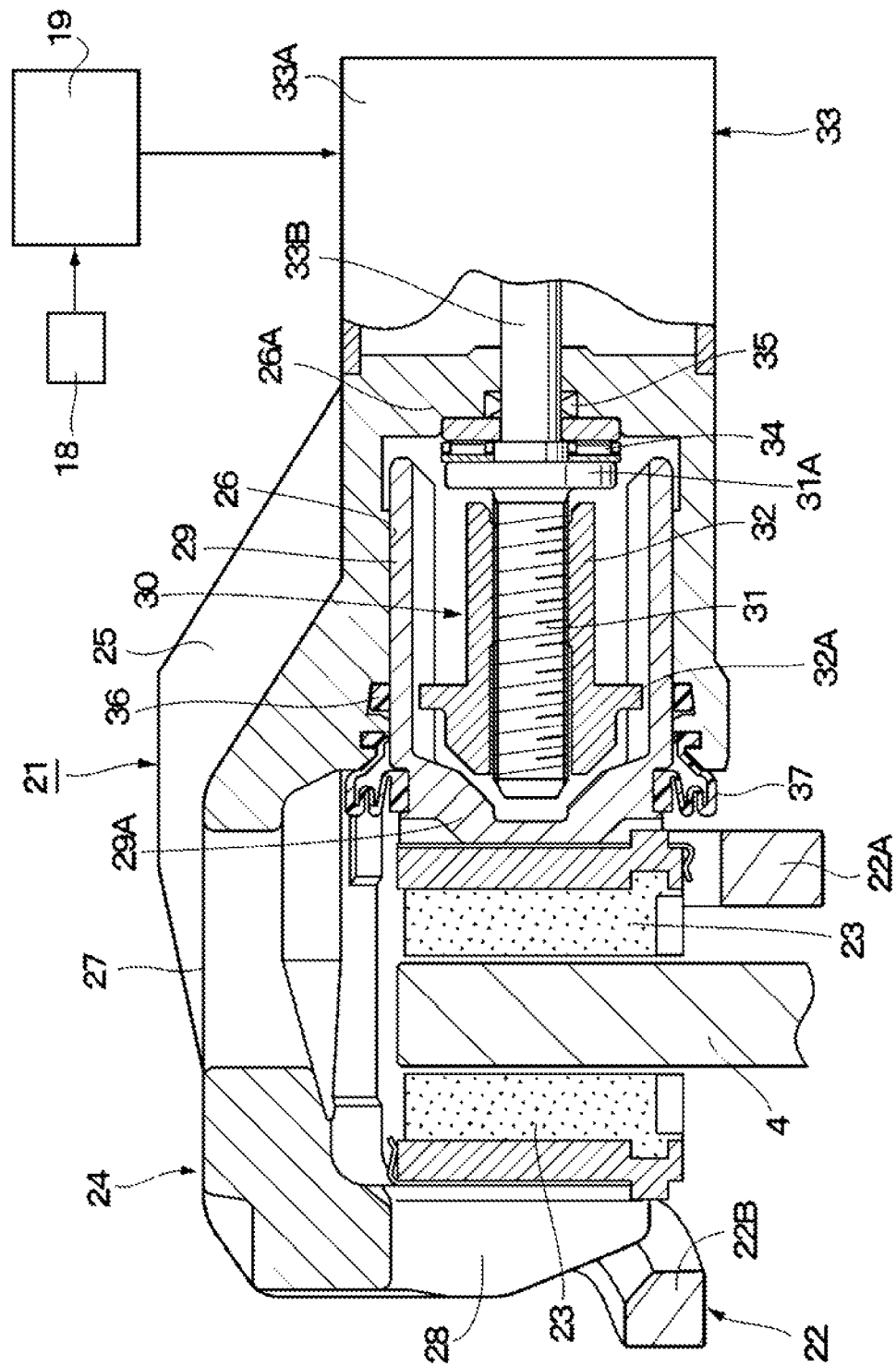
FIG. 2 is an enlarged vertical cross-sectional view illustrating a disk brake provided with an electric parking brake, which is mounted on a rear wheel side illustrated in FIG. 1.

The parking brake controller 19 is constituted by, for example, a microcomputer, and power is supplied from the battery 14 to the parking brake controller 19 via the power source line 15. The parking brake controller 19 constitutes a controller which is a component of the present invention. The parking brake controller 19 controls driving of the disk brake (i.e., the electric actuator 33), which will be described below, and generates a braking force when the vehicle is parked, stopped, and the like. As illustrated in FIGS. 1 and 2, the input side of the parking brake controller 19 is connected to, for example, the parking brake switch 18. The output side of the parking brake controller 19 is connected to, for example, the electric actuator 33 of the disk brake 21. Further, the input side and the output side of the parking brake controller 19 are connected to, for example, the control unit 13 of the ESC 11 via the vehicle data bus 16. Further, the parking brake controller 19 is electrically connected to the pressure sensor 17, and acquires a detection value of the pressure sensor 17. The parking brake controller 19 is connected to the pressure sensor 17 via, for example, the vehicle data bus 16, and acquires a detection value of the pressure sensor 17 via the vehicle data bus 16.

The parking brake controller 19 includes a storage unit (not illustrated) such as a flash memory, a ROM, and a RAM. A processing program illustrated in FIG. 3, which will be described below, i.e., a processing program used in control processing to actuate (apply) the parking brake is stored in the storage unit. Further, a processing program illustrated in FIGS. 5 and 6, i.e., a processing program used in control processing to stop (release) the parking brake is stored in the storage unit. Further, a program of the above-described logic for determining actuation and release of the parking brake, and the like are stored in the storage unit.

When the driver of the vehicle operates the parking brake switch 18, the parking brake controller 19 drives the electric actuator 33, which will be described below, based on a signal (ON/OFF signal) output from the parking brake switch 18 to actuate the disk brake 12 as the parking brake or release an operation of the disk brake 12 as the parking brake. A voltage sensor for detecting a voltage in the power source line 15, and a current sensor and a voltage sensor (both are not illustrated) for detecting a current of each electric actuator 33 and a voltage between terminals are installed in the parking brake controller 19. Therefore, when the parking brake is stopped (released), i.e., when a piston holding mechanism (a linearly movable member 32 and a screw member 31), which will be described below, releases holding of a piston 29, the parking brake controller 19 is configured to be able to stop driving the electric actuator 33 based on a current value of the electric actuator 33.

Further, when the piston holding mechanism releases holding of the piston 29, the parking brake controller 19 receives or acquires the hydraulic pressure P in the caliper 24 detected by the pressure sensor 17. Then, when holding of the piston 29 is released, the parking brake controller 19 acquires a detection value of the hydraulic pressure P, and stops driving the electric actuator 33 after a predetermined time period T17 has elapsed from issue of an instruction to release the holding of the piston 29 and a start of driving the electric actuator 33 (steps 29 and 30 in FIG. 5, which will be describe below) if the hydraulic pressure P is a predetermined value P11 or higher. On the other hand, the parking brake controller 19 stops driving the electric actuator 33 based on a current value IM of the electric actuator 33 (steps 13 to 18 in FIG. 5, which will be described below), if the hydraulic pressure P is lower than the predetermined value P11. This control to stop driving the electric actuator 33 will be described in detail below.

Next, the structure of the disk brake 21 provided with the electric parking brake, which is mounted on the rear wheel 3, will be described with reference to FIG. 2.

The disk brake 21, which constitutes the disk brake apparatus according to the present embodiment together with the parking brake controller 19, is configured as a hydraulic disk brake provided with an electric parking brake. The disk brake 21 includes a mounting member 22 mounted on a non-rotatable portion at the rear wheel side of the vehicle, inner-side and outer-side brake pads 23, and a caliper 24 to which the electric actuator 33 is attached. The electric actuator 33 will be described below.

The mounting member 22 includes a pair of arm portions (not illustrated) disposed so as to extend over the outer circumference of the disk rotor 4 in the axial direction of the disk rotor 4 (i.e., a disk axial direction) and spaced apart from each other in a disk circumferential direction, and a thick support portion 22A disposed so as to integrally connect proximal end sides of the respective arm portions and fixed to the non-rotatable portion of the vehicle at a position on an inner side of the disk rotor 4. Further, a reinforcement beam 22B is integrally formed at the mounting member 22 at a position on an outer side of the disk rotor 4 so as to connect distal end sides of the respective arm portions.

Therefore, the arm portions of the mounting member 22 are integrally connected to each other via the support portion 22A on the inner side of the disk rotor 4, and are integrally connected to each other via the reinforcement beam 22B on the outer side. The brake pads 23 at the inner side and the outer side are disposed on both surfaces of the disk rotor 4, and are supported by the respective arm portions of the mounting member 22 movably in the disk axial direction. The brake pads 23 on the inner side and the outer side are pressed against the both surface sides of the disk rotor 4 by the caliper 24 (a caliper main body 25 and the piston 29), which will be described below.

The caliper 24 is disposed at the mounting member 22 so as to extend over the outer circumferential side of the disk rotor 4. The caliper 24 includes the caliper main body 25 supported movably relative to the respective arm portions of the mounting member 22 along the axial direction of the disk rotor 4, the piston 29 and the rotation/linear motion conversion mechanism 30 disposed in the caliper main body 25, the electric actuator 33, and the like. The piston 29 and the rotation/linear motion conversion mechanism 30 will be described below.

The caliper main body 25 includes the cylinder portion 26, a bridge portion 27, and a claw portion 28. The cylinder portion 26 is formed into a bottomed cylindrical shape having one axial end closed to serve as a partitioning wall portion 26A, and another axial end as an opening end to face the disk rotor 4. The bridge portion 27 is formed so as to extend over the outer circumferential side of the disk rotor 4 from the cylinder portion 26 in the disk axial direction. The claw portion 28 is disposed so as to extend at an opposite side of the bridge portion 27 from the cylinder portion 26. The cylinder portion 26 of the caliper main body 25 constitutes an inner leg portion provided at one side (the inner side) of the disk rotor 4, and the claw portion 28 constitutes an outer leg portion provided at another side (the outer side) of the disk rotor 4.

The cylinder portion 26 of the caliper main body 25 constitutes a hydraulic cylinder, which is a component of the present invention. A hydraulic pressure is supplied into the cylinder portion 26 via the brake-side pipe portion 12C or 12D illustrated in FIG. 1 according to, for example, a pressing operation applied to the brake pedal 6. This cylinder portion 26 includes the integrally formed partitioning wall portion 26A between the cylinder portion 26 and the electric actuator 33, which will be described below. An output shaft 33B of the electric actuator 33 is rotatably inserted at inner peripheral side of the partitioning wall portion 26A. The piston 29, the rotation/linear motion conversion mechanism 30 which will be described below, and the like are disposed in the cylinder portion 26 of the caliper main body 25.

The piston 29 is inserted in the cylinder portion 26 with one axial side as an opening side thereof contained in the cylinder portion 26. A cover portion 29A is formed at another axial side of the piston 29, which faces the inner-side brake pad 23, thereby closing this side. Further, the rotation/linear motion conversion mechanism 30 is disposed in the cylinder portion 26 while being contained in the piston 29. The piston 29 is configured to be thrust in the axial direction of the cylinder portion 26 by the rotation/linear motion conversion mechanism 30. The rotation/linear motion conversion mechanism 30 constitutes a piston thrust mechanism, which is a component of the present invention, and is configured to thrust the piston 29 by an external force (the electric actuator 33) independently of the above-described application of the hydraulic pressure into the cylinder portion 26.

The rotation/linear motion conversion mechanism 30 includes a screw member 31 constituted by a rod-like body with a male screw such as a trapezoidal thread formed around it, and a linearly movable member 32 as a thrust member with a female screw hole as a trapezoidal thread formed on the inner circumferential side thereof. In other words, the screw member 31 screwed with the inner circumferential side of the linearly movable member 32 constitutes a screw mechanism that converts a rotational motion by the electric actuator 33, which will be described below, into a linear motion of the linearly movable member 32. In this case, the female screw of the linearly movable member 32 and the male screw of the screw member 31 are formed by using a highly irreversible screw such as a trapezoidal thread in the present embodiment, thereby constituting the piston holding mechanism. This piston holding mechanism holds the linearly movable member 32 (i.e., the piston 29) at an arbitrary position with the aid of a frictional force (a holding force) even when power is not supplied to the electric actuator 33, thereby realizing power saving. The piston holding mechanism may be embodied by any mechanism capable of holding the thrust piston, such as a highly irreversible screw other than the trapezoidal thread.

The screw member 31, which is screwed with the inner circumferential side of the linearly movable member 32, includes a flange portion 31A as a large-diameter flange at one axial side thereof. Another axial side of the screw member 31 extends toward the cover portion 29A of the piston 29. The flange portion 31A of the screw member 31 is integrally coupled to the output shaft 33B of the electric actuator 33, which will be described below. Further, an engagement protrusion 32A is disposed on the outer circumferential side of the linearly movable member 32 so as to prevent the linearly movable member 32 from rotating relative to the piston 29 (preventing a relative rotation therebetween) while allowing the linearly movable member 32 to axially move relative to the piston 29.

The electric actuator 33 as an electric motor is disposed in a casing 33A. This casing 33A is fixed to the cylinder portion 26 of the caliper main body 25 at a position outside the partitioning wall portion 26A. The electric actuator 33 includes a known electric motor with a stator, a rotor, and the like installed therein, and a speed reducer configured to amplify a torque of the electric motor (both the electric motor and the speed reducer are not illustrated). The speed reducer includes the output shaft 33B for outputting an amplified rotational torque. The output shaft 33B extends axially through the partitioning wall portion 26A of the cylinder portion 26, and is coupled to the flange portion 31A of the screw member 31 in the cylinder portion 26 so as to be rotatable integrally therewith.

The output shaft 33B and the screw member 31 are coupled by, for example, a means capable of allowing an axial movement but preventing a rotational movement, with use of a known technique such as fitting using a spline or fitting using a polygonal column (non-circular fitting). The speed reducer may be embodied by, for example, a planetary gear speed reducer or a worm gear speed reducer.

An effective measure for reducing manufacturing cost of the electric actuator 33 is to reduce manufacturing precision (processing precision, assembling precision, and the like) of parts. However, reducing the manufacturing precision may lead to an increase in a backlash between the electric actuator 33 and the rotation/linear motion conversion mechanism 30 in the rotational direction due to a backlash of the speed reducer, a backlash between the flange portion 31A and the output shaft 33B. Further, a variation (an individual difference) generated in manufacturing may result in a reduction or an increase in the backlash in the rotational direction. However, according to a method for controlling the electric actuator 33 according to the present embodiment, which will be described below, it is possible to accurately release the parking brake regardless of this backlash in the rotational direction.

When the driver operates the parking brake switch 18 illustrated in FIGS. 1 and 2, power is supplied from the power source line 15 to the electric actuator 33 via the parking brake controller 19 to cause the output shaft 33B of the electric actuator 33 to rotate. Therefore, the screw member 31 of the rotation/linear motion conversion mechanism 30 rotates integrally with the output shaft 33B in, for example, one direction, to thrust (drive) the piston 29 toward the disk rotor 4 via the linearly movable member 32. As a result, the disk brake 21 sandwiches the disk rotor 4 between the inner-side and outer-side brake pads 23, thereby being actuated (applied) as an electric parking brake.

On the other hand, when the parking brake switch 18 is operated toward the brake release side, the screw member 31 of the rotation/linear motion conversion mechanism 30 is rotationally driven in another direction (a reverse direction) by the electric actuator 33. As a result, the linearly movable member 32 is driven in a return direction to be separated (spaced apart) from the disk rotor 4 via the rotation/linear motion conversion mechanism 30, whereby the disk brake 21 stops (releases) an operation as the parking brake.

In this case, at the rotation/linear motion conversion mechanism 30, a rotation of the screw member 31 relative to the linearly movable member 32 causes the linearly movable member 32 to axially relatively move according to a rotational angle of the screw member 31 since the linearly movable member 32 is prevented from rotating in the piston 29. In this manner, the rotation/linear motion conversion mechanism 30 converts a rotational motion into a linear motion. The present embodiment employs a screw mechanism as the rotation/linear motion conversion mechanism 30. However, the rotation/linear motion conversion mechanism 30 may be realized by another rotation/linear motion conversion mechanism such as a ball screw mechanism, a ball ramp mechanism, a roller ramp mechanism, or a precision roller screw mechanism. Further, the present embodiment is configured in such a manner that the rotation/linear motion conversion mechanism 30 is contained or accommodated in the piston 29. However, the rotation/linear motion conversion mechanism 30 does not necessarily have to be contained or accommodated in the piston 29 as long as the piston 29 can be thrust by the rotation/linear motion conversion mechanism 30.

A thrust bearing 34 is disposed between the partitioning wall portion 26A of the cylinder portion 26 and the flange portion 31A of the screw member 31. This thrust bearing 34 bears a thrust load from the screw member 31 together with the partitioning wall portion 26A to facilitate a rotation of the screw member 31 relative to the partitioning wall portion 26A. Further, a seal member 35 is disposed between the partitioning wall portion 26A of the cylinder portion 26 and the output shaft 33B of the electric actuator 33. The seal member 35 seals between the partitioning wall portion 26A and the output shaft 33B so as to prevent brake fluid in the cylinder portion 26 from leaking toward the electric actuator 33.

Further, a piston seal 36 and a dust boot 37 are disposed at the opening end side of the cylinder portion 26. The piston seal 36 serves as an elastic seal that seals between the cylinder portion 26 and the piston 29. The dust boot 37 prevents a foreign object from entering the cylinder portion 26. The dust boot 37 is constituted by a flexible bellows-type seal member, and is attached between the opening end of the cylinder portion 26 and the outer circumference of the cover portion 29A of the piston 29.

The disk brake 5 at the front wheel 2 is configured in a substantially similar manner to the disk brake 21 at the rear wheel 3 except for the parking brake mechanism. In other words, the disk brake 5 at the front wheel 2 does not include, for example, the rotation/linear motion conversion mechanism (the screw member 31 and the linearly movable member 32) and the electric actuator 33 that operate as the parking brake, unlike the disk brake 21 at the rear wheel 3. However, except therefor, the disk brake 5 at the front wheel 2 is also configured in a substantially similar manner to the disk brake 21. Further, in other embodiments, the vehicle may be configured in such a manner that the disk brake 21 provided with the electric parking brake is also mounted on the front wheel 2, instead of the disk brake 5.

Further, the disk brake 21 employed in the present invention may be configured in a different manner from the above-described embodiment, as long as the disk brake 21 is configured as a hydraulic disk brake apparatus provided with a parking brake using an electric rotational motor.

The disk brake apparatus of the four-wheeled automobile according to the present embodiment is configured in the above-described manner, and an operation thereof will be described next.

When the driver of the vehicle presses the brake pedal 6, this pressing force is transmitted to the master cylinder 8 via the booster apparatus 7, and a brake hydraulic pressure is generated by the master cylinder 8. The hydraulic pressure generated in the master cylinder 8 is distributed and supplied to the respective disk brakes 5 and 21 via the cylinder-side hydraulic pipes 10A and 10B, ESC 11, and the brake-side pipe portions 12A, 12B, 12C, and 12D, whereby a braking force is provided to each of the left and right front wheels 2 and the left and right rear wheels 3.

In this case, the disk brake 21 at the rear wheel 3 operates in the following manner. The hydraulic pressure is supplied into the cylinder portion 26 of the caliper 24 via the brake-side pipe portions 12C and 12D, and the piston 29 is slidably displaced toward the inner-side brake pad 23 according to an increase in the hydraulic pressure in the cylinder portion 26. As a result, the piston 29 presses the inner-side brake pad 23 against one side surface (an inner-side surface) of the disk rotor 4, and a reaction force therefrom causes the whole caliper 24 to be slidably displaced toward the inner side of the disk rotor 4 relative to the respective arm portions of the mounting member 22.

As a result, the outer leg portion (the claw portion 28) of the caliper 24 operates so as to press the outer-side brake pad 23 against the disk rotor 4, by which the disk rotor 4 is sandwiched between the pair of brake pads 23 from both axial sides, thereby generating a braking force according to the supplied hydraulic pressure. On the other hand, when the brake operation is released, the supply of the hydraulic pressure into the cylinder portion 26 is released and stopped, whereby the piston 29 is displaced so as to be retracted into the cylinder portion 26 to cause the inner-side and outer-side brake pads 23 to be spaced apart from the disk rotor 4, thereby returning the vehicle into a non-braked state.

Next, when the driver of the vehicle operates the parking brake switch 18 toward the brake application side to actuate the parking brake, power is supplied from the parking brake controller 19 to the electric actuator 33 of the disk brake 21 to rotationally drive the output shaft 33B of the electric actuator 33. The disk brake 21 provided with the electric parking brake converts the rotation of the electric actuator 33 into a linear motion via the screw member 31 and the linearly movable member 32 of the rotation/linear motion conversion mechanism 30 to axially move the linearly movable member 32 to thrust the piston 29, thereby pressing the pair of brake pads 23 against the both surfaces of the disk rotor 4.

At this time, the linearly movable member 32 is held in a brake applying state with the aid of a frictional force (holding force) generated between the linearly movable member 32 and the screw member 31, and the disk brake 21 at the rear wheel 3 is actuated as the parking brake. In other words, even after a stop of the supply of power to the electric actuator 33, the linearly movable member 32 (i.e., the piston 29) can be held at a brake applying position by the piston holding mechanism constituted by the female screw of the linearly movable member 32 and the male screw of the screw member 31.

On the other hand, when the driver operates the parking brake switch 18 toward the brake release side to release the parking brake, power for a reverse rotation of the motor is supplied from the parking brake controller 19 to the electric actuator 33, whereby the output shaft 33B of the electric actuator 33 is rotated in the reverse direction from the direction when the parking brake is applied. At this time, at the rotation/linear motion conversion mechanism 30, the braking force held by the screw member 31 and the linearly movable member 32 is released, and the linearly movable member 32 is moved in the return direction into the cylinder portion 26 by a movement amount corresponding to the reverse rotation of the electric actuator 33, thereby releasing the braking force of the parking brake (the disk brake 21).

One possible configuration therefor is to stop driving the electric actuator 33 according to a current value of the electric actuator 33 when the disk brake 21 is actuated as the parking brake or an operation thereof is released. However, according to this configuration, for example, when an operation of the parking brake is released, the electric actuator 33 may excessively rotate depending on how much a hydraulic pressure is in the caliper 4 (the cylinder portion 26) at that time, thereby causing the linearly movable member 32, which is a member supposed to push the piston 29, to be largely retracted from the disk rotor 4. In this case, the next time the parking brake is actuated, the linearly movable member 32 may have to move by a long distance, leading to a reduction in the responsiveness (increase a time taken to complete actuation of the parking brake).

Therefore, the present embodiment is configured to determine a stop of driving of the electric actuator 33 according to a current value IM of the electric actuator 33 and the hydraulic pressure P at that time when an operation of the parking brake is released. Hereinafter, control processing performed by the parking brake controller 19 when the parking brake is actuated (applied) and when the parking brake is stopped (released) will be described with reference to FIGS. 3, 5, and 6. In the following description, the terms "apply" and "application" will be used to refer to an operation for starting the parking brake, i.e., an operation for providing a predetermined pressing force to the brake pads 23 and holding the piston position at that time. Similarly, the term "release" will be used to refer to an operation for stopping the parking brake, i.e. an operation for releasing this holding state.

First, control processing performed by the parking brake controller 19 at the time of the application will be described with reference to FIG. 3.

Figure 3:
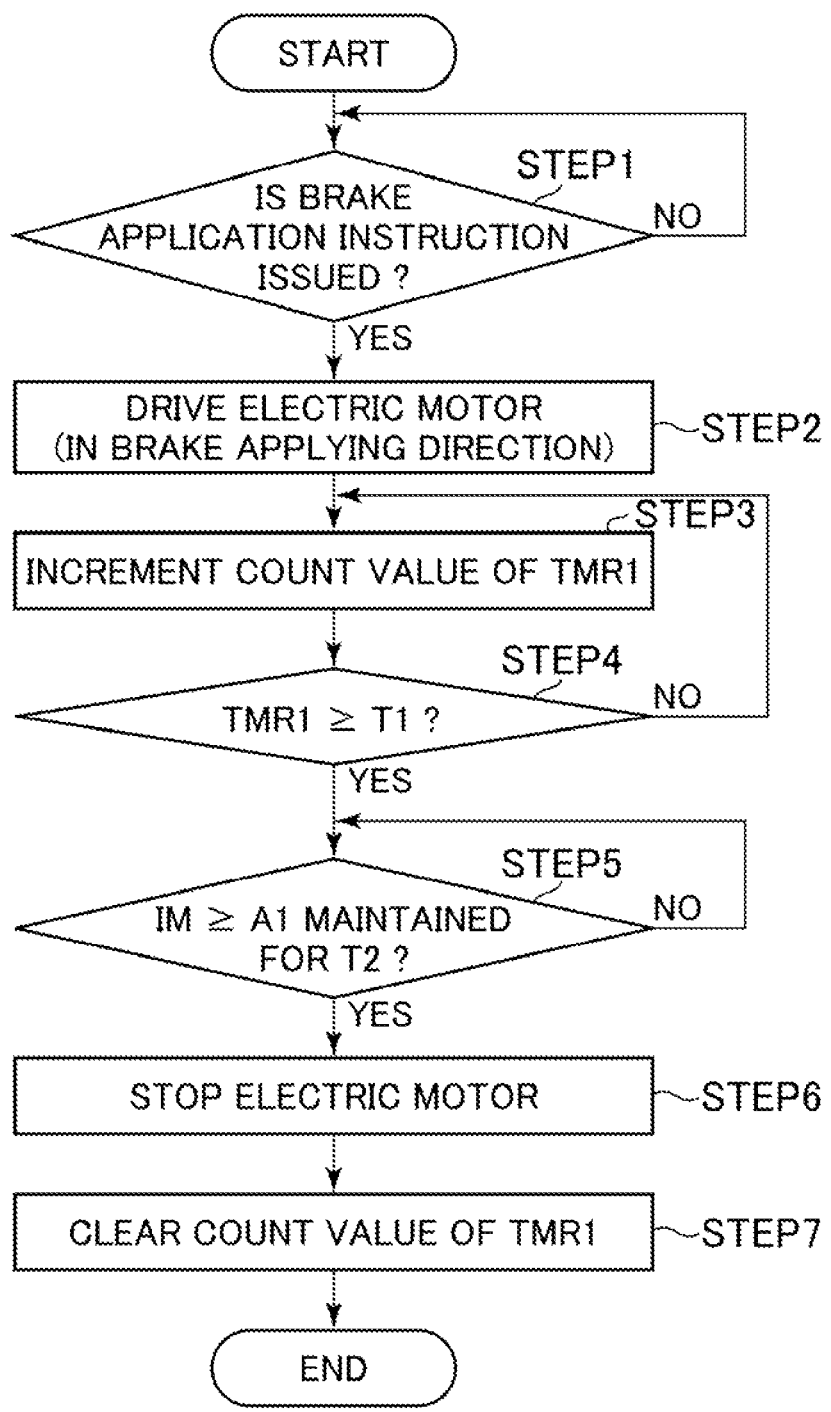
FIG. 3 is a flowchart illustrating control processing by a parking brake controller illustrated in FIG. 1 when the parking brake is activated (applied)

After a start of a processing operation illustrated in FIG. 3, in step 1, the parking brake controller 19 determines whether an application instruction is issued based on the parking brake switch 18 and the logic for determining whether the parking brake is actuated. If the parking brake controller 19 determines "NO", i.e., determines that no application instruction is issued, the processing returns to step 1. On the other hand, if the parking brake controller 19 determines "YES" in step 1, i.e., determines that an application instruction is issued, the processing proceeds to step 2.

In step 2, the parking brake controller 19 drives the electric actuator 33 in the direction causing the linearly movable member 32 (the piston 29) to move toward the disk rotor 4 based on the determination of "YES" in step 1. Next, in step 3, the parking brake controller 19 increments a count value of a timer TMR1. Next, in step 4, the parking brake controller 19 determines whether a predetermined time period T1 has elapsed from the start of time measurement by the timer TMR1, i.e., the start of driving of the electric actuator 33 (the count of the timer TMR1 is the predetermined time period T1 or larger).

If the parking brake controller 19 determines "NO" in step 4, i.e., determines that the predetermined time period T1 has not elapsed yet (TMR1<T1), the processing returns to between step 2 and step 3. Then, in step 3, the parking brake controller 19 increments the count value of the timer TMR1. On the other hand, if the parking brake controller 19 determines "YES" in step 4, i.e., determines that the predetermined time period T1 has elapsed (TMR1≥T1), the processing proceeds to step 5. The predetermined time period T1 is set so as to be longer than a time taken until an inrush current (refer to A0 in FIG. 4) generated immediately after the start of power supply to the electric actuator 33 falls below a predetermined value A1.

Next, in step 5, the parking brake controller 19 determines whether the piston 29 has reached a brake applying position. Therefore, in step 5, the parking brake controller 19 determines whether the current value IM of the electric actuator 33 is maintained at a predetermined value A1 or larger (IM≥A1) for a predetermined time period T2. If the parking brake controller 19 determines "NO" in step 5, i.e., determines that the current value IM is not maintained at the predetermined value A1 or larger for the predetermined time period T2, the processing returns to step 5. On the other hand, if the parking brake controller 19 determines "YES" in step 5, i.e., determines that the current value IM is maintained at the predetermined value A1 or larger for the predetermined time period T2, the processing proceeds to step S6.

In step 6, the parking brake controller 19 stops the power supply to the electric actuator 33. As a result, the actuation of the rotation/linear motion conversion mechanism 30 is completed, and the piston 29 is held at the brake applying position. Then, in subsequent step, step 7, the count value of the timer TMR1 is cleared, ending the control processing performed by the parking brake controller 19 at the time of the application of the parking brake.

Figure 4:
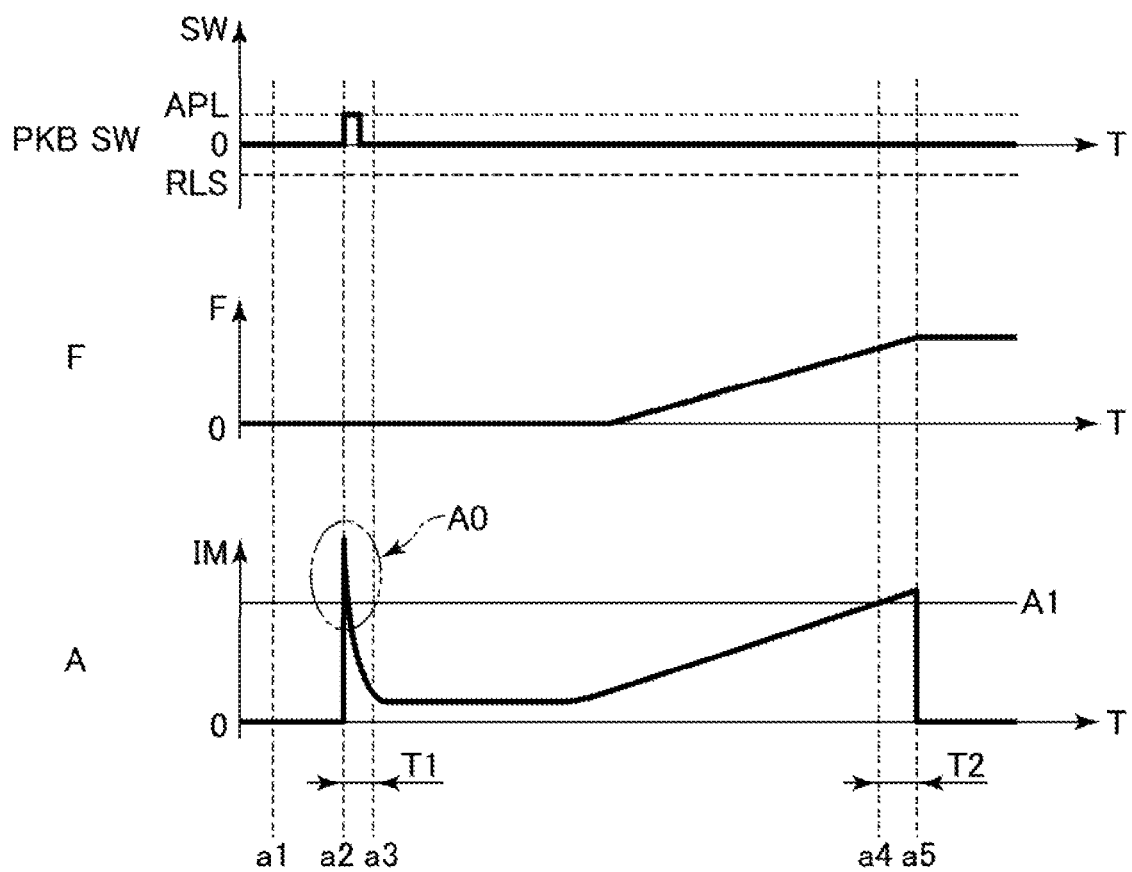
FIG. 4 illustrates characteristic lines that indicate examples of temporal changes in a parking brake switch, a thrust force of a rotation/linear motion conversion mechanism, and a current of an electric actuator, when the parking brake is activated.

FIG. 4 illustrates temporal changes in the operation (SM) applied to the parking brake switch 18, the thrust force (F) generated at the rotation/linear motion conversion mechanism 30 (generated by the electric actuator 33), and the current (IM) of the electric actuator 33 at the time of the application of the parking brake. Next, these temporal changes will be described with reference to FIG. 4.

At time a1 on a temporal axis, no application instruction (APL) is issued via the parking brake switch 18, the electric actuator 33 is out of operation, and no current (IM) is supplied to the electric actuator 33. At time a2 on the temporal axis, an application instruction is issued via the parking brake switch 18 (the parking brake controller 19 determines "YES" in step 1), and then the parking brake controller 19 drives (supplies power to) the electric actuator 33 in the direction causing the linearly movable member 32 (the piston 29) to move toward the disk rotor 4 (step 2). At this time (immediately after the power supply), the electric actuator 33 shifts from a stopped state to a driven state. Therefore, after a large inrush current (A0) is generated first, the electric actuator 33 is set into the driven state and the current IM of the electric actuator 33 gradually reduces. During a predetermined time period T1 from time a2 to time a3 on the temporal axis when the electric actuator 33 is being driven, the parking brake controller 19 refrains from determining whether the current IM is the predetermined value A1 or higher (step 4). These steps, step 3 and step 4 can prevent false determination due to the inrush current.

After the predetermined time period T1 has elapsed, the thrust force F generated at the rotation/linear motion conversion mechanism 30 increases by the driving of the electric actuator 33, causing the brake pads 23 to be pressed against the disk rotor 4, whereby the current IM of the electric actuator 33 increases gradually during a period from time a3 to time a4 on the temporal axis. Then, the parking brake controller 19 determines whether the current IM of the electric actuator 33 is maintained at the predetermined value A1 or higher during the predetermined time period T2 (step 5). If the current IM is maintained at the predetermined value A1 or higher during the predetermined time period T2 (the time period from time a4 to time a5 corresponds to the predetermined time period T2 in an example illustrated in FIG. 4), at time a5 on the temporal axis, the parking brake controller 19 stops the power supply to the electric actuator 33, thereby completing the application of the parking brake (step 6). This predetermined time period T2 is set to prevent false detection of completion of the application of the parking brake due to a rippling noise superimposed on the current IM. If a noise filter is used, the present embodiment can be realized by just determining whether the current IM is the predetermined value A1 or higher. Further, the predetermined value A1 may be corrected according to an inclination of a road surface where the vehicle is parked, and how much the hydraulic pressure P is in the disk brake 21 (the caliper 24).

Next, control processing performed by the parking brake controller 19 when the parking brake is released will be described with reference to FIGS. 5 and 6.

Figure 5:
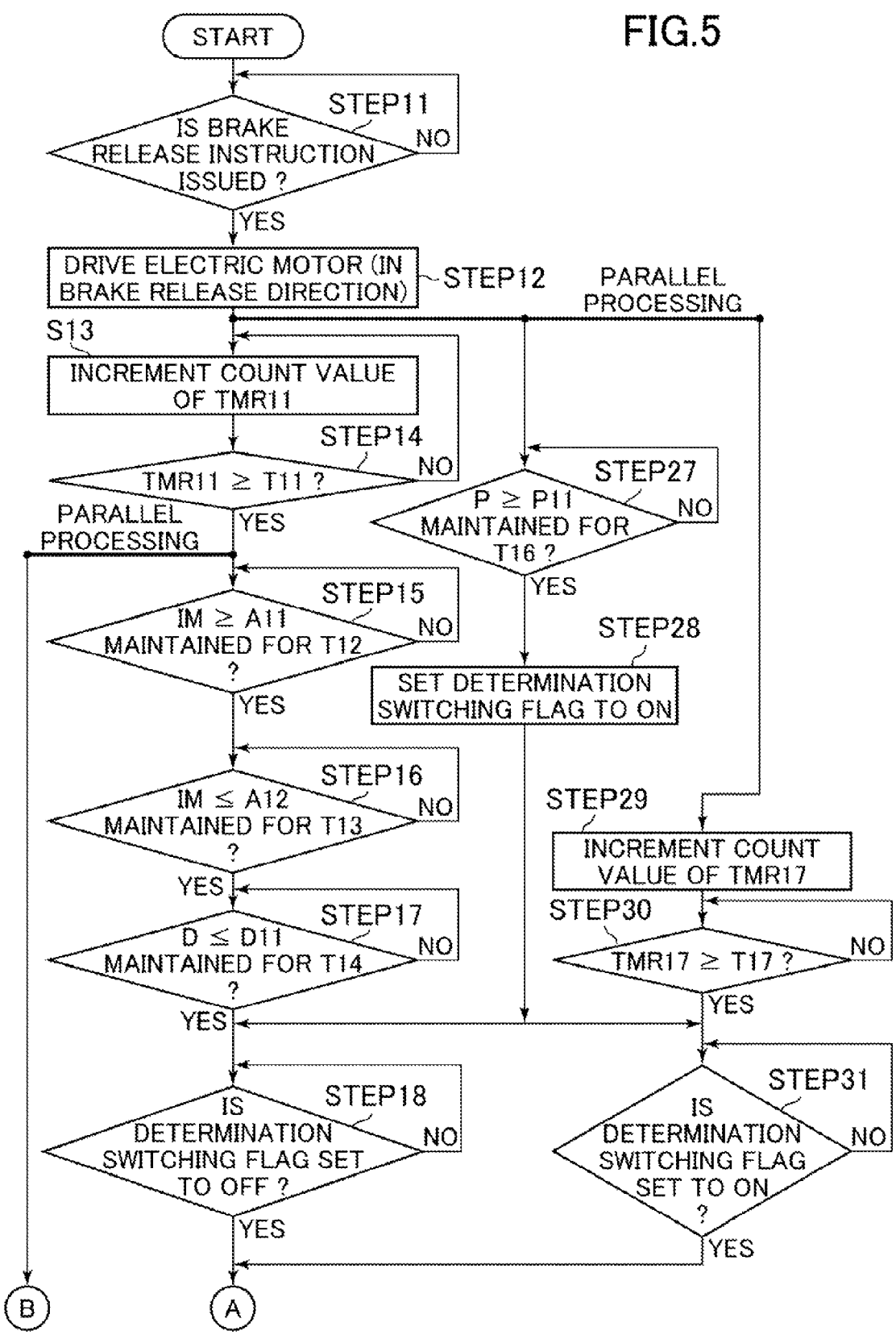
FIG. 5 is a flowchart illustrating control processing by the parking brake controller illustrated in FIG. 1 when the parking brake is stopped (released).

Upon a star of a processing operation illustrated in FIG. 5, in step 11, the parking brake controller 19 determines whether a release instruction is issued based on the parking brake switch 18 and the logic for determining a release of the parking brake. If the parking brake controller 19 determines "NO" in step 11, i.e., determines that no release instruction is issued, the processing returns to step 11. On the other hand, if the parking brake controller determines "YES" in step 11, i.e., determines that a release instruction is issued, the processing proceeds to step 12.

In step 12, the parking brake controller 19 drives the electric actuator 33 in a direction causing the linearly movable member 32 (the piston 29) to move away from the disk rotor 4 based on the determination "YES" in step 11. After the parking brake controller 19 drives the electric actuator 33 (starts driving the electric actuator 33) in step 12, the processing proceeds from step 12 to step 13, step 27, and step 29. In this case, steps subsequent to step 13, steps subsequent to step 27, and steps subsequent to step 29 are performed in parallel.

Step 13 to step 18 are steps where the parking brake controller 19 monitors the driving current IM of the electric actuator (the electric motor) 33, and detects a removal of the thrust force F, i.e., a release of the thrust force F generated by the electric actuator 33 (current-based determination). Further, step 29 to step 31 are steps where the parking brake controller 19 estimates a removal of the thrust force F, i.e., a release of the thrust force F generated by the electric actuator 33 based on a time period (an elapse of the time) during which the electric actuator 33 is driven (time-based determination). Further, step 27 and step 28 are steps where the parking brake controller 19 determines whether to use the above-described current-based determination or time-based determination based on the hydraulic pressure P when the release starts.

First, in step 13, the parking brake controller 19 increments a count value of a timer TMR11. Next, in step 14, the parking brake controller 19 determines whether a predetermined time period T11 has elapsed from a start of the time measurement, i.e., a start of the driving of the electric actuator 33, based on the count value of the timer TMR11 (whether the count value of the timer TMR11 is a predetermined time T11 or larger). If the parking brake controller 19 determines "NO" in step 14, i.e., determines that the predetermined time period T11 has not elapsed yet (TMR11<T11), the processing returns to step 13, in which the parking brake controller 19 increments the count value of the timer TMR1. In this manner, a change in the current value due to the inrush current is excluded from a subsequent determination about the current value.

On the other hand, if the parking brake controller 19 determines "YES" in step 14, i.e., determines that the predetermined time T11 has elapsed (TMR11≥T11), the processing proceeds from step 14 to step 15 and step 26. In this case, steps subsequent to step 15 and steps subsequent to step 26 are performed in parallel. The predetermined time T11 is set so as to be longer than a time taken until the inrush current (refer to A10 in FIG. 7) generated immediately after a start of power supply to the electric actuator 33 falls below a predetermined value A11.

In step 15, the parking brake controller 19 determines based on a change in the current IM whether the thrust force F applied to the rotation/linear motion conversion mechanism 30, i.e., the thrust force F generated by the electric actuator 33 starts to reduce. The current IM starts to increase when the thrust force F starts to reduce, whereby the parking brake controller 19 determines whether the thrust force F starts to reduce in step 15 by determining whether the current value IM of the electric actuator 33 is maintained at the predetermined value A11 or larger (IM≥A11) for a predetermined time period T12. If the parking brake controller 19 determines "NO" in step 15, i.e., determines that the current value IM is not maintained at the predetermined value A11 or larger for the predetermined time period T12, the processing returns to step 15. On the other hand, if the parking brake controller 19 determines "YES" in step 15, i.e., determines that the current value IM is maintained at the predetermined value A11 or larger for the predetermined time period T12, the processing proceeds to step 16. The predetermined value A11 may be a fixed value, but may be corrected according to the hydraulic pressure P in the disk brake 21 (the caliper 24) and the voltage V from the power source line 15. In this case, the predetermined value A11 is set to a smaller value as the hydraulic pressure P increases, and is set to a smaller value as the voltage V reduces. Further, the predetermined value A11 may be corrected according to the predetermined value A1 used in the application of the parking brake. In this case, the predetermined value A11 is set to a smaller value as the predetermined value A1 reduces.

Figure 7:
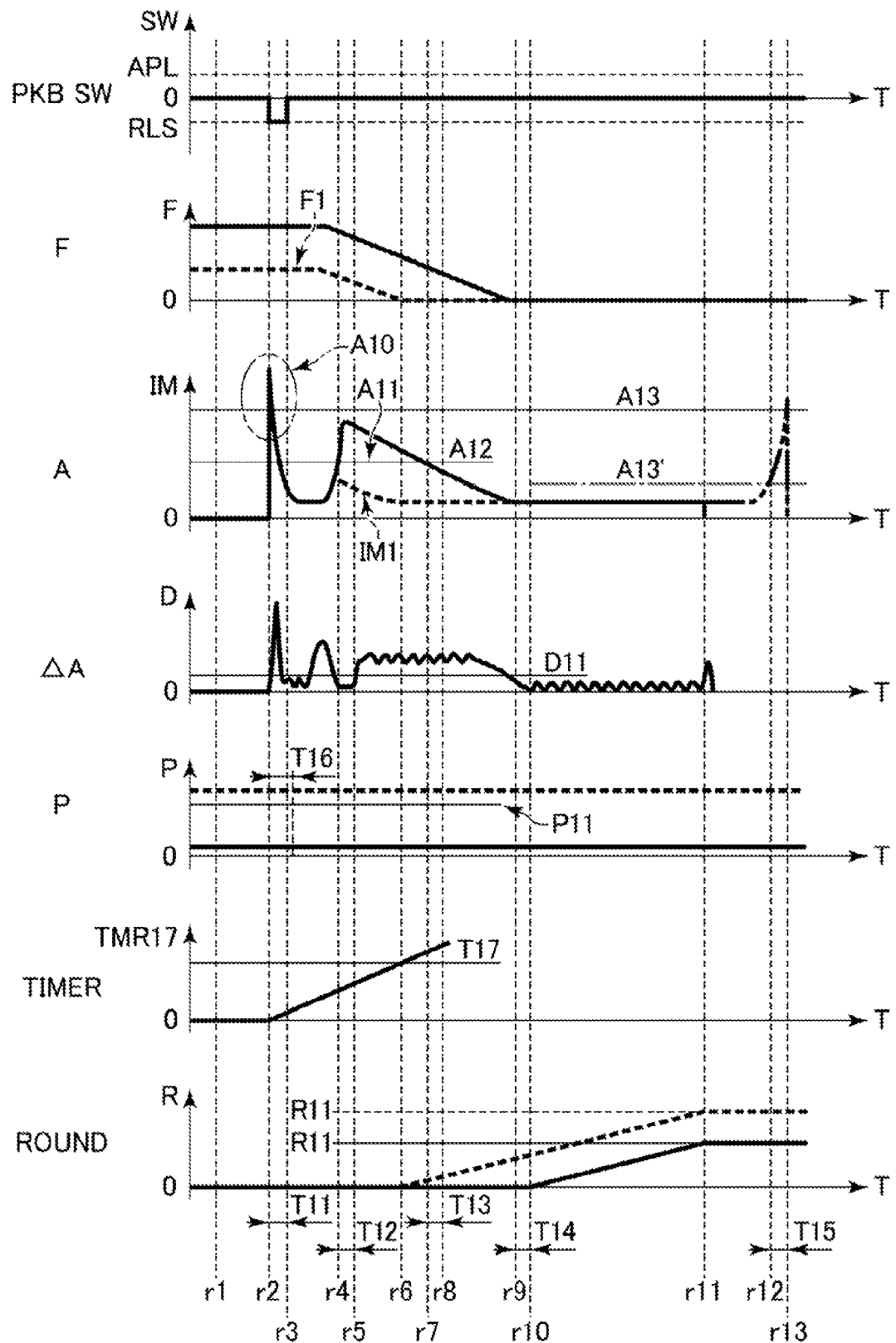
FIG. 7 illustrates characteristic lines that indicate examples of temporal changes in the parking brake switch, the thrust force of the rotation/linear motion conversion mechanism, the current of the electric actuator, a current differential value, a hydraulic pressure, a timer, and a rotational amount, when the parking brake is released.

Next, in step 16, the parking brake controller 19 determines based on a change in the current IM whether the thrust force F (the thrust force F generated by the electric actuator 33) applied to the rotation linear motion conversion mechanism 30 approaches 0 after that (after the parking brake controller 19 determines "YES" in step 15). The current IM reduces as the thrust force F approaches 0, whereby the parking brake controller 19 determines in step 16 whether the thrust force F approaches 0 by determining whether the current IM of the electric actuator 33 is maintained at a predetermined value A12 or smaller for a predetermined time period T13. If the parking brake controller 19 determines "NO" in step 16, i.e., determines that the current value IM is not maintained at the predetermined value A12 or smaller for the predetermined time period T13, the processing returns to step 16. On the other hand, if the parking brake controller 19 determines "YES" in step 16, i.e., determines that the current value IM is maintained at the predetermined value A12 or smaller for the predetermined time period T13, the processing proceeds to step S17. The predetermined value A11 and the predetermined value A12 may be a same value or different values. In FIG. 7 that illustrates characteristic lines, the predetermined value A11 and the predetermined value A12 are set to a same value. FIG. 7 will be described below.

Next, in step 17, the parking brake controller 19 determines whether the thrust force F applied to the rotation/linear motion conversion mechanism 30 (the thrust force F generated by the electric actuator 33) reduces to 0 after that (after the parking brake controller 19 determines "YES" in step 16) based on whether the current IM is substantially kept constant. Therefore, in step 17, the parking brake controller 19 determines whether a current differential value D of the electric actuator 33 is maintained at a predetermined value D11 or smaller for a predetermined time period T14. If the parking brake controller 19 determines "NO" in step 17, i.e., determines that the current differential value D is not maintained at the predetermined value D11 or smaller for the predetermined time period T14, the processing returns to step 17. On the other hand, if the parking brake controller 19 determines "YES" in step 17, i.e., determines that the current differential value D is maintained at the predetermined value D11 or smaller for the predetermined time period T14, the processing proceeds to step 18.

In step 18, the parking brake controller 19 determines whether a determination switching flag is set to OFF. The determination switching flag will be described below. If the parking brake controller 19 determines "YES" in step 18, i.e., determines that the determination switching flag is set to OFF (the processing cannot proceed from step 27 to step 28 so that the determination switching flag cannot be set to ON, as will be described below), the processing proceeds to step 19 illustrated in FIG. 6. On the other hand, if the parking brake controller 19 determines "NO" in step 18, i.e., determines that the determination switching flag is not set to OFF (the processing proceeds from step 27 to step 28 so that the determination switching flag is set to ON, as will be described below), the processing returns to step 18. In this case, the processing repeatedly returns to step 18, and cannot proceed from step 18 to step 19, whereby the advance to step 19 is achieved via step 31, which will be described below.

On the other hand, in step 29, the parking brake controller 19 increments a count value of a timer TMR17. Next, in step 30, the parking brake controller 19 determines based on the count value of the timer TMR17 whether a predetermined time period T17 has elapsed from a start of the time measurement, i.e., a start of the driving of the electric actuator 33 (whether the count value of the timer TMR17 is the predetermined time T17 or larger). If the parking brake controller 19 determines "NO" in step 30, i.e., determines that the predetermined time period T17 has not elapsed yet (TMR17<T17), the processing returns to step 30, in which the parking brake controller 19 increments the count value of the timer TMR17. On the other hand, if the parking brake controller 19 determines "YES" in step 30, i.e., determines that the predetermined time period T17 has elapsed (TMR17≥T17), the processing proceeds to step 31.

The predetermined time period T17 is a time period for determining whether the thrust force F generated by the electric motor (the electric actuator 33) is released, and can be set based on a relationship between the detected hydraulic pressure P and a force by which the piston holding mechanism (the linearly movable member 32 and the screw member 31) holds the piston 29. More specifically, when the parking brake is released, the timing at which the force (the thrust force) of the linearly movable member 32 reduces to zero varies (changes) depending on the hydraulic pressure P and the force for holding the piston 29 (i.e., the thrust force F applied to the rotation/linear motion conversion mechanism 30 as a reactive force of the holding force). Therefore, the predetermined time period T17 is set according to the hydraulic pressure P and the force for holding the piston 29, by which the predetermined time period T17 can be set to an appropriate value according to the hydraulic pressure P and the force for holding the piston 29.

For example, the predetermined time period T17 can be set to a shorter time period as the detected hydraulic pressure increases. Further, the predetermined time period T17 can be set to a shorter time period as the force for holding the piston 29 reduces. In other words, the force (the thrust force F) of the linear movable member 32 reduces to zero more rapidly as the hydraulic pressure P increases, or the force for holding the piston 29 reduces. Therefore, it is possible more reliably determine (more correctly estimate or detect) that the force (the thrust force F) of the linearly movable member 32 reduces to zero by setting the predetermined time period T17 according to the hydraulic pressure P and the force for holding the piston 29. As a result, it is possible to stop driving the electric actuator 33 at an appropriate timing (stop the linearly movable member 32 at a desired position appropriately spaced apart from the disk rotor 4).

Further, it is also preferable to correct the predetermined time period T17 using the hydraulic pressure P and the voltage V from the power source line 15 as parameters. For example, the predetermined time period T17 is set so as to reduce as the hydraulic pressure P increases. On the other hand, the predetermined time period T17 is also set so as to reduce as the voltage V increases. Further, the predetermined time period T17 may be corrected based on the predetermined value A1 used in the application of the parking brake. In this case, the predetermined time period T17 is set so as to reduce as the predetermined value A1 reduces.

Next, in step 31, the parking brake controller 19 determines whether the determination switching flag is set to ON. The determination switching flag will be described below. If the parking brake controller 19 determines "YES" in step 31, i.e., determines that the determination switching flag is set to ON (the processing proceeds from step 27 to step 28 so that the determination switching flag is set to ON, as will be described below), the processing proceeds to step 19 illustrated in FIG. 6. On the other hand, the parking brake controller 19 determines "NO" in step 18, i.e., determines that the determination switching flag is not set to ON (the processing cannot proceed from step 27 to step 28 so that the determination switching flag is not set to ON, as will be described below), the processing returns to step 31. In this case, the processing repeatedly returns to step 31, whereby the processing cannot proceed from step 31 to step 19. In this case, the advance to step 19 is achieved via step 18.

According to the present embodiment, the parking brake controller 19 is configured to switch the method for determining whether the thrust force F applied to the rotation/linear motion conversion mechanism 30 reduces to zero (determining whether the thrust force F generated by the electric actuator 33 is released) according to how much the hydraulic pressure P is. In other words, the parking brake controller 19 is configured to determine whether the thrust force F reduces to zero based on the determination about the current IM and the current differential value D in steps 15, 16, and 17 or based on the determination about an elapse of the predetermined time period T17 in step 30, which are switched according to how much the hydraulic pressure P is.

Therefore, in step 27, the parking brake controller 19 determines whether the hydraulic pressure P applied to the disk brake 21 is maintained at a predetermined value P11 or higher for a predetermined time period T16. The hydraulic pressure P is detected by, for example, the pressure sensor 17. Further, the predetermined value P11 is set in advance as a value allowing the parking brake controller 19 to switch the method for determining whether the thrust force F reduces to zero between the determination based on the current value IM (the current-based determination) and the determination based on an elapse of the predetermined time period T17 (the time-based determination). If the parking brake controller determines "YES" in step 27, i.e., determines that the hydraulic pressure P is maintained at the predetermined value P11 or higher for the predetermined time period T16, the processing proceeds to step 28. Then, in step 28, the determination switching flag is set to ON.

On the other hand, if the parking brake controller 19 determines "NO" in step 27, i.e., determines that the hydraulic pressure P is not maintained at the predetermined value P11 or higher for the predetermined time period T16, the processing returns to step 27. Therefore, if the parking brake controller 19 does not determine "YES" in step 27 (the parking brake controller 19 repeatedly determines "NO"), the determination switching flag remains set to OFF, which is a default value. In this case, when the parking brake controller 19 determines "YES" in step 17, the condition in step 18 is satisfied (the parking brake controller 19 determines "YES" in step 18), whereby the processing proceeds to step 19 illustrated in FIG. 6 via step 18. On the other hand, if the parking brake controller 19 determines "YES" in step 27, in the subsequent step, step 28, the determination switching flag is set to ON. In this case, when the parking brake controller 19 determines "YES" in step 30, the condition in step 31 is satisfied (the parking brake controller 19 determines "YES" in step 31), whereby the processing proceeds to step 19 illustrated in FIG. 6 via step 31.

Figure 6:
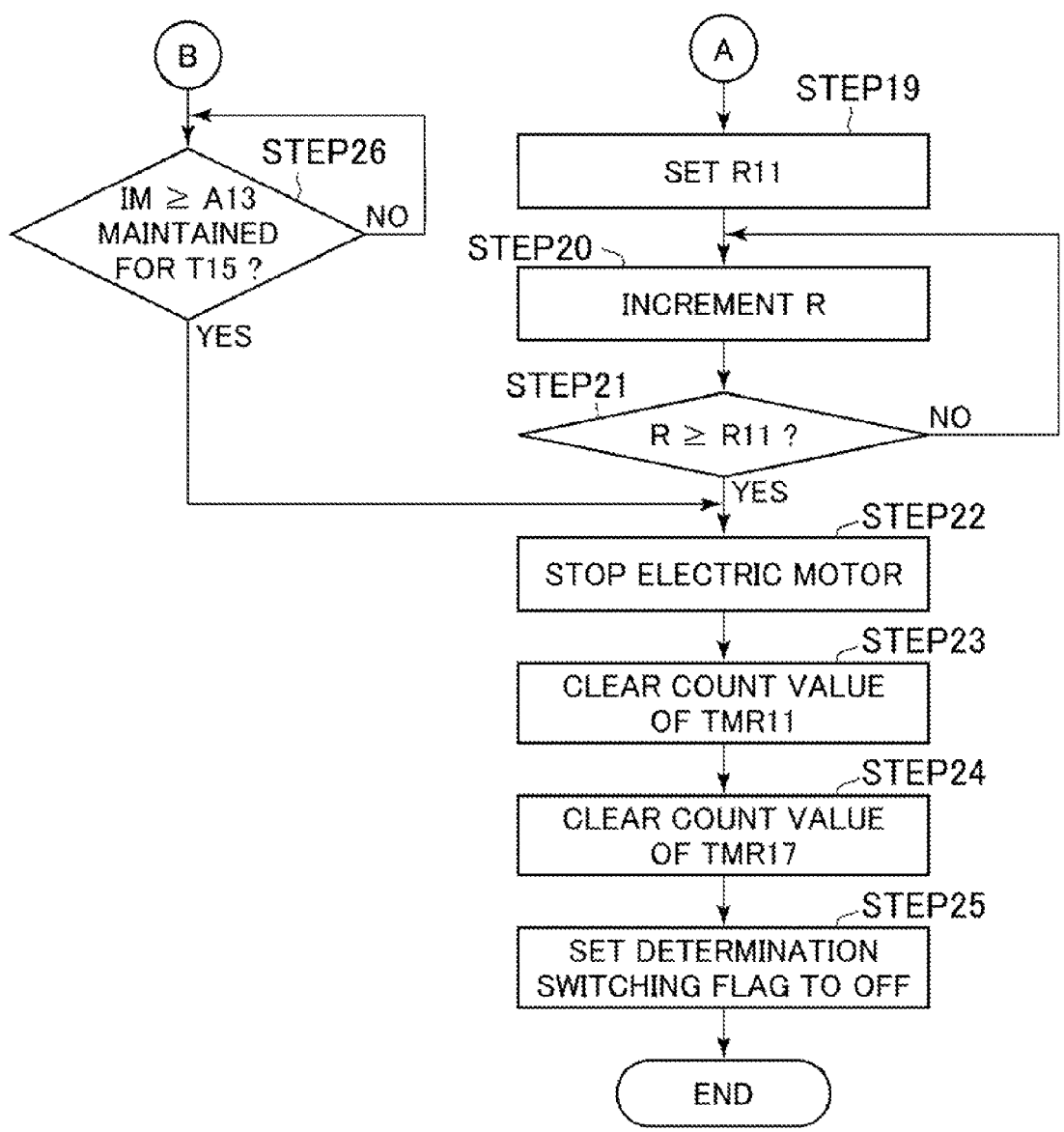
FIG. 6 is a flowchart as a continuation of the flowchart illustrated in FIG. 5.

Next, steps 19 to 22 illustrated in FIG. 6 are steps for generating a predetermined space between the disk 4 and the brake pad 23 (moving back the linearly movable member 32 to a position allowing acquisition of a required space) after the parking brake controller 19 determines that the thrust force F of the electric actuator 33 is removed, i.e., the thrust force F generated by the electric actuator 33 is released in the previous steps. In step 19, the parking brake controller 19 sets a predetermined value R11 for a rotational amount R of the electric actuator 33. This predetermined value R11 corresponds to a value (a movement amount) by which the linearly movable member 32 should be further retracted from a position of the linearly movable member 32 when the parking brake controller 19 determines that the thrust force F reduces to zero. The predetermined value R11 is set so as to increase as the hydraulic pressure P increases. For example, in FIG. 7 illustrating a characteristic line of the rotational amount R, which will be described below, a solid line R11 indicates the predetermined value R11 for a low hydraulic pressure (the predetermined value R11 when the processing proceeds step 18 to step 19). A broken line R11 indicates the predetermined value R11 for a high hydraulic pressure (the predetermined value R11 when the processing proceeds from step 31 to step 19).

After the parking brake controller 19 sets the predetermined value R11 in step 19, in the subsequent step, step 20, the parking brake controller 19 increments the rotational amount R of the electric actuator 33. In the known electric motor constituting the electric actuator 33, a rotational speed N and the current IM are in a substantially inversely proportional relationship. Therefore, the rotational speed N is calculated from the current IM, and this rotational speed N is integrated, by which a rotational amount increase ΔR can be obtained.

The rotational amount increase ΔR is a rotational amount of the electric actuator 33 during a predetermined time taken for the parking brake controller 19 to execute the determination processing routine. Then, the total rotational amount R can be calculated by the following expression 1, and the rotational amount increase ΔR can be calculated by the following expression 2.

$$\text{ROTATIONAL AMOUNT } R = \text{ROTATIONAL AMOUNT (PREVIOUS VALUE)} + \text{ROTATIONAL AMOUNT INCREASE } \Delta R \quad (1)$$

$$\text{ROTATIONAL AMOUNT INCREASE } \Delta R = \text{COEFFICIENT } C \times (\text{VOLTAGE } Vm - \text{CURRENT } IM \times \text{RESISTANCE } Rs) \quad (2)$$

In expression 2, the voltage Vm is a voltage applied to the electric actuator 33, which is detected by the parking brake controller 19. The resistance Rs is an electric resistance at the output side from the parking brake controller 19. The coefficient C is a value determined from a relationship between the rotational speed N of the electric actuator 33 and the current IM.

After the parking brake controller 19 increments the rotational amount R (i.e. increments the count values for rotational amount R) in step 20, in the subsequent step, step 21, the parking brake controller 19 determines whether the rotational amount R of the electric actuator 33 reaches the predetermined value R11, i.e., determines the rotational amount R is the predetermined value R11 or larger (R≥R11). If the parking brake controller 19 determines "NO" in step 21, i.e., determines that the rotational amount R of the electric actuator 33 does not reach the predetermined value R11, the processing returns to step 20, in which the parking brake controller 19 increments the rotational amount R. On the other hand, if the parking brake controller determines "YES" in step 21, i.e., determines that the rotational amount R of the electric actuator 33 reaches the predetermined value R11, the processing proceeds to step 22.

In step 22, the parking brake controller 19 stops the power supply to the electric actuator 33. As a result, the electric actuator 33 stops applying the thrust force F to the rotation/linear motion conversion mechanism 30, and the linearly movable member 32 is stopped at a position appropriately spaced apart from the disk rotor 4, thereby completing the release of the parking brake. Next, in step 23, the parking brake controller 19 clears the count value of the timer TMR11. In the subsequently step, step 24, the parking brake controller 19 clears the count value of the timer TMR17. Further, in step 25, the parking brake controller 19 sets the determination switching flag to OFF (leaves the determination switching flag set to OFF if the determination switching flag is already set to OFF). When the processing reaches "END", all steps that are being repeated, such as steps 18 and 31, are cleared.

The rotation/linear motion conversion mechanism 30 may return to the original position, i.e., the end surface of the linearly movable member 32 with the female screw hole formed therein may return into abutment with the flange portion 31A of the screw member 31 with the male screw formed thereon before satisfaction with the condition of step 21 (before the parking brake controller 19 determines "YES" in step 21), depending on a variation in manufacturing of the disk brake 21. In this case, the electric actuator 33 may stop rotating and a large current may be generated (a stall current). Therefore, in step 26 subsequent to step 14, i.e., in step 26 performed in parallel with the steps subsequent to step 15, the parking brake controller 19 determines whether the current value IM of the electric actuator 33 is maintained at a predetermined value A13 or larger for a predetermined time period T15.

If the parking brake controller 19 determines "NO" in step 26, i.e., determines that the current value IM is not maintained at the predetermined value A13 or larger for the predetermined time period T15, the processing returns to step 26. On the other hand, if the parking brake controller 19 determines "YES" in step 26, i.e., determines that the current value IM is maintained at the predetermined value A13 or larger for the predetermined time period T15, the processing proceeds to step 22. In this case, the parking brake controller 19 determines that the end surface of the linearly movable member 32 is in abutment with the flange portion 31A of the screw member 31, and the processing proceeds from step 26 to step 22 (the parking brake controller 19 stops the power supply to the electric actuator 33) without proceeding through step 21 (the processing does not proceed to step 22 based on the determination YES in step 21). The sensitivity can increase by, for example, reducing the predetermined value A13 to a predetermined value A13' at time r10 on the temporal axis (refer to FIG. 7), i.e., when the parking brake controller 19 determines YES in step 17. In other words, the predetermined value A13 can be reduced when the processing reaches step 19 (at time r6 on the temporal axis for a high hydraulic pressure P, or time r10 for a low hydraulic pressure P). In this manner, it is possible to increase the sensitivity for detecting that the current value IM is maintained at the predetermined value A13 or larger for the predetermined time period T15 while preventing this detection from being confused with the processing for detecting that the current value IM is at the predetermined value A11 or larger for the predetermined time period T11 (step 15).

FIG. 7 illustrates temporal changes in the operation (SW) applied to the parking brake switch 18, the thrust force (F) generated at the rotation/linear motion conversion mechanism 30 (generated by the electric actuator 33), the current (IM) of the electric actuator 22, the current differential value (D), the hydraulic pressure P in the disk brake 21 (the caliper 24), the timer (TMR17), and the rotational amount (R) when the parking brake is released. These changes will be described next with reference to FIG. 7.

First, the above-described items change as follows when the hydraulic pressure P is low, i.e., the hydraulic pressure P is lower than the predetermined value P11, and the determination switching flag is set to OFF. In FIG. 7, changes for the low hydraulic pressure P are indicated by solid lines, and changes for the high hydraulic pressure P (the hydraulic pressure P equal to or higher than the predetermined value P11) are indicated by broken lines. Further, similarly, the predetermined value R11 for the low hydraulic pressure P is indicated by a solid line, and the predetermined value R11 for the high hydraulic pressure P is indicated by a broken line.

At time r1 on the temporal axis, a release instruction (RLS) is not issued via the parking brake switch 18. Therefore, the electric actuator 33 is out of operation, and no current IM is supplied to the electric actuator 33. At time r2 on the temporal axis, a release instruction is issued via the parking brake switch 18 (the parking brake controller 19 determines "YES" in step 11), and then the parking brake controller 19 starts power supply to (actuates) the electric actuator 33 in a direction causing the linearly movable member (the piston 29) to move away from the disk rotor 4 (step 12). At this time (immediately after the start of the power supply), the electric actuator 33 shifts from a stopped state to a driven state. Therefore, after a large inrush current (A10) is generated first, the electric actuator 33 is set into a driven state and the current IM of the electric actuator 33 reduces gradually. During the predetermined time period T11 from time r2 and r3 on the temporal axis when the electric actuator 33 is being driven, the parking brake controller 19 refrains from determining whether the current IM is predetermined value A11 or larger (step 14).

After the predetermined time period T11 has elapsed, as the rotation/linear motion conversion mechanism 30 starts to work to reduce the thrust force F according to the driving of the electric actuator 33, the current IM of the electric actuator 33 increases (is amplified) gradually. Then, the parking brake controller 19 determines whether the current IM of the electric actuator 33 is maintained at the predetermined value A11 or larger for the predetermined time period T12 (step 15). At time r4 on the temporal axis, the current IM reaches or exceeds the predetermined value A11. At time r5 on the temporal axis, the predetermined time period T12 has elapsed. Then, next, the parking brake controller 10 determines whether the current value IM of the electric actuator 33 is maintained at the predetermined value A12 or smaller for the predetermined time period T13 to determine whether the thrust force F applied to the rotation/linear motion conversion mechanism 33 is approaching zero (step 16).

At time r7 on the temporal axis, the current IM falls below the predetermined value A12. At time r8 on the temporal axis, the predetermined time period T13 has elapsed. Then, next, the parking brake controller 19 determines whether the current differential value D of the electric actuator 33 is maintained at the predetermined value D11 or smaller for the predetermined time period T14 to determine whether the thrust force F applied to the rotation/linear motion conversion mechanism 30 reduces to zero (step 17). At time r9 on the temporal axis, the current differential value D fallows below the predetermined value D11. At time t10 on the temporal axis, the predetermined time period T14 has elapsed. Then, next, the parking brake controller 19 increments the rotational amount R of the electric actuator 33 (step 20). The timer TMR 17 indicates that the predetermined time period T17 has elapsed at time r6 on the temporal axis, but the rotational amount R is not incremented from time r6, since the determination switching flag is set to OFF at this time (the condition of step 31 is unsatisfied).

Then, the parking brake controller 19 determines whether the rotational amount R of the electric actuator 33 reaches the predetermined value R11 (step 21). When the rotational amount R reaches the predetermined value R11 at time r11 on the temporal axis, the parking brake controller 19 stops the power supply to the electric actuator 33, thereby completing the release of the parking brake (step 22). In the present embodiment, the parking brake controller 19 determines whether the return of the thrust member (the linearly movable member 32) is completed from the reduction of the thrust force F to zero, based on the rotational amount R of the electric actuator 33. However, this determination may be made based on the time-based determination according to an elapse of a predetermined time period. In this case, this predetermined time period is corrected so as to increase as the hydraulic pressure P increases, and to reduce as the voltage V from the power source line 15 increases.

Next, the changes when the hydraulic pressure P is high, i.e., the hydraulic pressure P is the predetermined value P11 or higher and the determination switching flag is set to ON will be described. In FIG. 7, the changes for the high hydraulic pressure P are indicated by the broken lines. Further, similarly, the predetermined value R11 for the high hydraulic pressure P is also indicated by the broken line.

When the high hydraulic pressure P is applied to the piston 29, the thrust force F applied to the rotation/linear motion conversion mechanism 30 reduces as indicated by a broken line F1 in FIG. 7, according to the increase in the hydraulic pressure P. Therefore, the current IM generated when the thrust force F reduces also reduces as indicated by a broken line IM1 in FIG. 7 proportionally to the current IM when the hydraulic pressure P is low. In this case, the current IM may be unable to reach or exceed the predetermined value A11.

Therefore, according to the present embodiment, when the hydraulic pressure P is high and the determination switching flag is set to ON, the parking brake controller 19 determines that the thrust force F reduces to zero at time r6 on the temporal axis when the timer TMR17 indicates that the predetermined time period T17 has elapsed as a time period from a start of the power supply to the electric actuator 33 (step 31), and starts incrementing the rotational amount R from time r6 on the temporal axis. Then, the parking brake controller 19 determines whether the rotational amount R of the electric actuator 33 reaches the predetermined value R11 (step 21). If the rotational amount R reaches the predetermined value R11 at time r11 on the temporal axis, the parking brake controller 19 stops the power supply to the electric actuator 33, thereby completing the release of the parking brake (step 22).

If the condition about the rotational amount R is not satisfied at time r11 on the temporal axis, for example, the rotation/linear motion conversion mechanism 30 may return to the original position at time r12 on the temporal axis so that the linearly movable member 32 and the flange portion 31A of the screw member 31 may be in abutment with each other and the electric actuator 33 may be stopped, suddenly increasing the current IM of the electric actuator 33 (refer to a two-dot chain line in FIG. 7). In this case, the parking brake controller 19 determines whether the current IM is maintained at the predetermined value A13 or larger for the predetermined time period T15 (step 26), whereby the parking brake controller 19 stops the power supply to the electric actuator 33 at time r13 on the temporal axis when the predetermined time period T15 has elapsed from time r12 on the temporal axis, thereby completing the release of the parking brake (step 22). In FIG. 7, the predetermined value A13 reduces at time r10 on the temporal axis, but the predetermined value A13 may be a fixed value, or may be arbitrarily changed according to a waveform of the current IM when the linearly movable member 32 and the flange portion 31A of the screw member 31 are not in abutment with each other (a changeable value may be set as the predetermined value A13).

As described above, a large variation may be generated in the backlash in the rotational direction depending on a variation in manufacturing if the manufacturing precision (processing precision and assembling precision) of parts is sacrificed to reduce the manufacturing cost of the electric actuator 33. In this case, for example, the time period between time r3 (when the predetermined time period T11 has elapsed) on the temporal axis and time r4 (when the current IM reaches or exceeds the predetermined value A11) on the temporal axis may be almost vanished or increased. Further, when the rotation/linear motion conversion mechanism 30 is embodied by such a mechanism that a backlash is generated in the rotational direction when the operation of the parking brake is switched from the application to the release (for example, a ball-and-ramp mechanism as the rotation/linear motion conversion mechanism 30), similarly, the time period during time r3 to time r4 may vary.

Therefore, according to the present embodiment, the parking brake controller 19 determines whether the thrust force F of the rotation/linear motion conversion mechanism 30 reduces to zero by first determining whether the current IM is the predetermined value A11 or higher (step 14), when the determination switching flag is set to OFF (when the hydraulic pressure P is low). As a result, it is possible to steadily (reliably) detect that the thrust force F reduces (starts to reduce) regardless of the time period from time r3 and time r4 on the temporal axis (regardless of whether this time period is long or short). Then, it is possible to detect that the thrust force F reduces to zero based on the electric differential value D by determining whether the current differential value D of the current IM is the predetermined value D or smaller.

When the electric actuator 33 is manufactured at high precision, the time period from time r3 to time r4 is stabilized as a short time (can be controlled to a constant value). In this case, the predetermined time period T11 may be set so as to be a time period between time r4 to time r7 (when the current IM is the predetermined value A12 or lower), and the parking brake controller 19 may only determine whether the current IM is the predetermined value A12 or lower (step 16) and whether the current differential value D is the predetermined value D11 or smaller (step 17) while omitting the determination whether the current IM is the predetermined value A11 or lower (step 15). Alternatively, the predetermined time period T11 may be set so as to be a time period from time r5 (when the predetermined time period T12 has elapsed) to time r8 (when the predetermined time period T13 has elapsed), and the parking brake controller 19 may only determine whether the current differential value D is the predetermined value D11 or smaller (step 17) while omitting the determination whether the current IM is the predetermined value A11 or lower (step 15) and the determination whether the current IM is the predetermined value A12 or lower (step 16).

Further, according to the present embodiment, the parking brake controller 19 is configured to set the determination switching flag to ON, and determine whether the thrust force F of the rotation/linear motion conversion mechanism 30 reduces to zero based on the determination about an elapse of the predetermined time period T17, which is indicated by the timer TMR17, if the hydraulic pressure P is maintained at the predetermined value P11 or higher for the predetermined time period T16 (if the hydraulic pressure is high). In this case, the parking brake controller 19 may be configured to determine whether the current differential value D is the predetermined value D11 or smaller (step 17) before starting incrementing the rotational amount R (step 20) after the predetermined time period T17 has elapsed (after step 30), to more steadily (reliably) detect that the thrust force F reduces to zero. Alternatively, the parking brake controller 19 may be configured to determine whether the current IM is the predetermined value A12 or lower (step 16), instead of determining whether the current differential value D is the predetermined value D11 or smaller (step 17), before starting incrementing the rotational amount R (step 20) after the predetermined time period T17 has elapsed (after step 30). Further alternatively, the parking brake controller 19 may be configured to make both determinations (step 16 and step 17), before starting incrementing the rotational amount R (step 20) after the predetermined time period T17 has elapsed (after step 30).

Further, according to the present embodiment, once the determination switching flag is set to ON during the release of the parking brake, even if the hydraulic pressure P falls below the predetermined value P11 after that, the parking brake controller 19 doest not set the determination switching flag to OFF until the power supply to the electric actuator 33 is completed. Therefore, for example, even if the hydraulic pressure P falls below the predetermined value P11 at time r8 on the temporal axis when the current IM falls below the predetermined value A11, the parking brake controller 19 does not determine whether the current IM is the predetermined value A11 or larger in step 15, thereby preventing false determination.

As described above, according to the present embodiment, the parking brake controller 19 is configured to switch the determination method from the determination based on the current IM and the current differential value D (the current-based determination) to the determination based on the predetermined time T17 (the time-based determination) according to how much the hydraulic pressure P is (if the hydraulic pressure is high) when the parking brake is released. Basically (when the hydraulic pressure P is low), the parking brake controller 19 can more correctly determine whether the thrust force F reduces to zero based on the current IM and the current differential value D. Therefore, according to the present embodiment, first, the parking brake controller 19 makes the determination based on the predetermined value A11 of the current IM, thereby making it possible to reliably determine that the thrust force F reduces to zero even with reduced manufacturing precision of the electric actuator 33.

However, when the hydraulic pressure P is high (for example, when the driver is pressing the brake pedal), it is difficult to make the determination based on the predetermined value A11, since the current IM does not increase as indicated by the broken line (IM1) as the characteristic line of the current IM of the electric actuator in FIG. 7. Therefore, when the hydraulic pressure P is high, the parking brake controller 19 switches the determination method to the determination based on the predetermined time T17, whereby it is possible to steadily (reliably) detect that the thrust force F reduces to zero. Therefore, it is possible to stop the electric actuator at an appropriate timing regardless of how much the hydraulic pressure P is (regardless of whether the hydraulic pressure P is high or low) when the parking brake is released. As a result, it is possible to stop the linearly movable member 32 as the thrust member for thrusting the piston 29 at a position appropriately spaced apart from the disk rotor 4, whereby it is possible to maintain excellent responsiveness next time the parking brake is applied (it is possible to prevent an increase in the time until completion of actuation of the parking brake).

The present embodiment has been described based on the example that uses the disk brake 21 provided with the electric parking brake as the left and right rear-side brakes. However, the present invention is not limited thereto, and the disk brake 21 provided with the electric parking brake may be used for brakes on all four wheels.

According to the above-described embodiment, it is possible to improve the responsiveness of braking (parking brake) using the electric motor.

According to the above-described embodiment, when the piston holding mechanism releases holding of the piston, if the hydraulic pressure in the caliper is a predetermined value or higher, the disk brake is configured so as to stop driving the electric motor based on an elapsed time (based on the time-based determination). Therefore, even when the current value of the electric motor change only slightly when the piston holding mechanism releases the holding of the piston due to a high hydraulic pressure in the caliper, it is possible to steadily determine (correctly estimate or detect) whether the force (the thrust force) of the thrust member for thrusting the piston reduces to zero (whether the thrust force generated by the electric motor is released) based on whether the predetermined time has elapsed. Therefore, it is possible to stop the electric motor at an appropriate timing, and therefore to stop the thrust member for thrusting the piston at a desired position appropriately spaced apart from the disk. As a result, it is possible to reduce a movement amount of the thrust member next time the thrust member is thrust by the electric motor, thereby improving the responsiveness of braking (the parking brake) using the electric motor.

On the other hand, when the hydraulic pressure in the caliper is lower than the predetermine value, the disk brake stops driving the electric motor based on a change status (a current value) of the driving current of the electric motor (based on the current-based determination). In this case, since the current value of the electric motor changes drastically when the piston holding mechanism releases the holding of the piston, it is possible to steadily determine (correctly estimate or detect) that the force (the thrust force) of the thrust member for thrusting the piston reduces to zero (the thrust force generated by the electric motor is released) based on the current value. Therefore, it is possible to stop the electric motor at an appropriate timing. Especially, with use of the current value, it is possible to correctly stop the electric motor at an appropriate timing according to the individual disk brake regardless of an individual difference of the disk brake apparatus. As a result, from this perspective, it is also possible to stop the thrust member at a desired position appropriately spaced apart from the disk, thereby improving the responsiveness of braking (the parking brake) using the electric motor.

According to the above-described embodiment, the disk brake is configured to set the predetermined time period for the time-based determination based on the relationship between the detected hydraulic pressure and the force by which the piston holding mechanism holds the piston. In other words, when the piston holding mechanism releases holding of the piston, the force (the thrust force generated by the electric motor) of the thrust member for thrusting the piston reduces to zero at a different diming according to the hydraulic pressure and the force for holding the piston. Therefore, it is possible to set the predetermined time period to an appropriate value according to the hydraulic pressure and the force for holding the piston by setting the predetermined time period according to the hydraulic pressure and the force for holding the piston. As a result, it is possible to stop driving the electric motor at an appropriate timing (stop the thrust member at a desired position appropriately spaced apart from the disk).

According to the above-described embodiment, the disk brake is configured so as to set the predetermined time period to a shorter time period as the detected hydraulic pressure increases. In other words, the force of the thrust member (the thrust force generated by the electric motor) reduces to zero at an earlier timing according to an increase in the hydraulic pressure. Therefore, it is possible to more steadily determine (more correctly estimate or detect) that the force of the thrust member (the thrust force generated by the electric motor) reduces to zero by setting or correcting the predetermined time period to a shorter time period according to an increase in the hydraulic pressure. As a result, it is possible to stop driving the electric motor at a more appropriate timing.

According to the above-described embodiment, the disk brake is configured so as to set the predetermined time period to a shorter time period as the force for holding the piston reduces. In other words, the force of the thrust force (the thrust force generated by the electric motor) reduces to zero at an earlier timing according to a reduction in the force for holding the piston. Therefore, it is possible to more steadily determine (more correctly estimate or detect) that the force of the thrust member (the thrust force generated by the electric motor) reduces to zero by setting or correcting the predetermined time period to a shorter time period according to a reduction in the force for holding the piston. As a result, it is possible to stop driving the electric motor at a more appropriate timing.

According to the above-described embodiment, the disk brake is configured to set the predetermined time period to a shorter time period as the voltage of the electric motor increases. In other words, the thrust member is more rapidly retracted by the electric motor according to an increase in the voltage of the electric motor, whereby the force of the thrust member (the thrust force generated by the electric motor) reduces to zero at an earlier timing accordingly. Therefore, it is possible to more steadily determine (more correctly estimate or detect) that the force of the thrust member (the thrust force generated by the electric motor) reduces to zero by setting or correcting the predetermined time period to a shorter time period according to an increase in the voltage of the electric motor. As a result, it is possible to stop driving the electric motor at a more appropriate timing.

According to the above-described embodiment, it is possible to improve the responsiveness of braking (the parking brake) using the electric motor.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2012-218358 filed on Sep. 28, 2012 including specification, claims, drawings and summary is incorporated herein by reference in its entirety.

What is claimed is:

1. A disk brake apparatus comprising:
   a caliper configured to be arranged adjacent to a disk integrally rotatable with a wheel of a vehicle, and comprising brake pads to be pressed against the disk for generating a braking force, a hydraulic cylinder, and a piston positioned in the hydraulic cylinder and configured to contact and press the brake pads to be pressed against the disk;

an electric motor included with the caliper and configured to apply a parking brake;

a piston thrust mechanism positioned in the caliper and including a thrust member configured to be driven by the electric motor to engage and thrust the piston without aid of a hydraulic pressure;

a piston holding mechanism configured to hold the thrust member so as to hold a position of the piston which has been thrust; and a controller configured to control the electric motor, wherein the piston is configured to be thrust by at least any one of a hydraulic pressure supplied to the caliper according to an operation of a brake pedal, and a thrust force generated via the piston thrust mechanism by a rotation of the electric motor in a first rotational direction, wherein the controller acquires the hydraulic pressure supplied to the caliper when the holding of the piston at the thrust force generated by the electric motor is released by a rotation of the electric motor in a second rotational direction opposite to the first rotational direction, wherein the controller determines whether the thrust force generated by the electric motor is released based on a change status of a current for driving the electric motor, when the hydraulic pressure acquired by the controller is lower than a predetermined value, and determines whether the thrust force generated by the electric motor is released based on a first predetermined time period elapsed from a start of driving of the electric motor, when the hydraulic pressure acquired by the controller is the predetermined value or higher, and wherein the controller sets the first predetermined time period based on a relationship between the hydraulic pressure acquired by the controller and a force by which the piston holding mechanism holds the piston, so as to reduce the first predetermined time period according to an increase in the hydraulic pressure acquired by the controller.

2. The disk brake apparatus according to claim 1, wherein the controller further sets the first predetermined time period to a shorter time as a voltage of the electric motor increases.

3. The disk brake apparatus according to claim 1, wherein the controller determines that the thrust force generated by the electric motor is released when a condition for the change status of the current for driving the electric motor that a value of the current for driving the electric motor decreases and a change rate of the value of the current for driving the electric motor also decreases is satisfied.

4. The disk brake apparatus according to claim 1, wherein the controller drives the electric motor for a second predetermined time period after determining that the thrust force generated by the electric motor is released.

5. A disk brake apparatus comprising:

a caliper configured to be arranged adjacent to a disk integrally rotatable with a wheel of a vehicle, and comprising brake pads to be pressed against the disk for generating a braking force, a hydraulic cylinder, and a piston positioned in the hydraulic cylinder and configured to contact and press the brake pads to be pressed against the disk and configured to receive a hydraulic pressure from a master cylinder;

an electric motor included with the caliper and configured to apply a parking brake;

a piston thrust mechanism positioned in the caliper and including a thrust member configured to be driven by the electric motor to engage and thrust the piston without aid of a hydraulic pressure;

a piston holding mechanism configured to hold the piston; and a controller configured to control the electric motor, wherein the piston is configured to be thrust by at least any one of the hydraulic pressure supplied to the caliper according to an operation of a brake pedal, and a thrust force generated via the piston thrust mechanism by a rotation of the electric motor in a first rotational direction, wherein, when the holding of the piston at the thrust force generated by the electric motor is released, the controller determines whether the thrust force generated by the electric motor is released based on a change status of a current for driving the electric motor, when a hydraulic pressure detected by a hydraulic pressure detector configured to detect the hydraulic pressure generated in the master cylinder is lower than a predetermined value, and determines whether the thrust force generated by the electric motor is released based on a first predetermined time period elapsed from a start of driving of the electric motor, when the hydraulic pressure generated in the master cylinder is the predetermined value or higher, and wherein the controller sets the first predetermined time period based on a relationship between the hydraulic pressure detected by the hydraulic pressure detector and a force by which the piston holding mechanism holds the piston, so as to reduce the first predetermined time period according to an increase in the hydraulic pressure detected by the hydraulic pressure detector.

6. The disk brake apparatus according to claim 5, wherein the controller further sets the first predetermined time period to a shorter time as a voltage of the electric motor increases.

7. The disk brake apparatus according to claim 5, wherein the controller determines that the thrust force generated by the electric motor is released when a condition for the change status of the current for driving the electric motor that a value of the current for driving the electric motor decreases and a change rate of the value of the current for driving the electric motor also decreases is satisfied.

8. The disk brake apparatus according to claim 5, wherein the controller drives the electric motor for a second predetermined time period after determining that the thrust force generated by the electric motor is released.

9. A disk brake apparatus comprising:

a caliper configured to be arranged adjacent to a disk integrally rotatable with a wheel of a vehicle, and comprising brake pads to be pressed against the disk for generating a braking force, a hydraulic cylinder, and a piston positioned in the hydraulic cylinder and configured to contact and press the brake pads to be pressed against the disk;

an electric actuator included with the caliper and configured to apply a parking brake;

a rotation/linear motion conversion mechanism configured to convert a rotation of the electric actuator into a linear motion to engage and thrust the piston, and hold the piston which has been thrust without aid of a hydraulic pressure; and a controller configured to control the electric actuator, wherein the piston is configured to be thrust by at least one any of a hydraulic pressure supplied to the caliper, and a thrust force generated via the rotation/linear motion conversion mechanism by a rotation of the electric actuator in a first rotational direction, wherein the controller acquires the hydraulic pressure supplied to the caliper when the holding of the piston at the thrust force generated by the electric actuator is released, and switches conditions for determining whether the thrust force generated by the electric actuator is released, based on a value of the hydraulic pressure acquired by the controller, and according to the conditions for determining whether the thrust force generated by the electric actuator is released, the controller makes a determination based on a change status of a current for driving the electric actuator, when the hydraulic pressure acquired by the controller is lower than a predetermined value, and the controller makes a determination based on a first predetermined time period elapsed from a start of driving of the electric actuator, when the hydraulic pressure is the predetermined value or higher, and wherein the controller reduces the first predetermined time period according to an increase in the hydraulic pressure acquired by the controller.

10. The disk brake apparatus according to claim 9, wherein the controller further sets the first predetermined time period to a shorter time as a voltage of the electric actuator increases.

11. The disk brake apparatus according to claim 9, wherein the controller determines that the thrust force generated by the electric actuator is released when a condition for the change status of the current for driving the electric actuator that a value of the current for driving the electric actuator decreases and a change rate of the value of the current for driving the electric actuator also decreases is satisfied.

12. The disk brake apparatus according to claim 9, wherein the controller drives the electric actuator for a second predetermined time period after determining that the thrust force generated by the electric actuator is released.

* * * * *